United States Patent
Alonzo et al.

(10) Patent No.: US 12,551,447 B2
(45) Date of Patent: Feb. 17, 2026

(54) COMBINATION SOLID ORAL DOSAGE FORMS OF GONADOTROPIN-RELEASING HORMONE ANTAGONISTS

(71) Applicant: Sumitomo Pharma Co., Ltd., Osaka (JP)

(72) Inventors: David E. Alonzo, Foster City, CA (US); Kathleen D. Ullmer, San Mateo, CA (US); Minli Xie, Belmont, CA (US)

(73) Assignee: Sumitomo Pharma Co., Ltd., Osaka (JP)

( * ) Notice: Subject to any disclaimer, the term of this patent is extended or adjusted under 35 U.S.C. 154(b) by 527 days.

(21) Appl. No.: 18/070,341

(22) Filed: Nov. 28, 2022

(65) Prior Publication Data

US 2023/0165800 A1    Jun. 1, 2023

Related U.S. Application Data

(63) Continuation of application No. PCT/EP2021/064280, filed on May 27, 2021.

(60) Provisional application No. 63/032,469, filed on May 29, 2020.

(51) Int. Cl.
| | | |
|---|---|---|
| *A61K 9/20* | (2006.01) | |
| *A61K 9/28* | (2006.01) | |
| *A61K 31/519* | (2006.01) | |
| *A61K 31/567* | (2006.01) | |

(52) U.S. Cl.
CPC .......... *A61K 9/2018* (2013.01); *A61K 9/2054* (2013.01); *A61K 9/2059* (2013.01); *A61K 9/2095* (2013.01); *A61K 9/2893* (2013.01); *A61K 31/519* (2013.01); *A61K 31/567* (2013.01)

(58) Field of Classification Search
None
See application file for complete search history.

(56) References Cited

U.S. PATENT DOCUMENTS

| | | |
|---|---|---|
| 5,573,777 A | 11/1996 | Serpelloni et al. |
| 6,265,393 B1 | 7/2001 | Heinrichs |
| 6,297,379 B1 | 10/2001 | Furuya et al. |
| 6,340,686 B1 | 1/2002 | Furuya et al. |
| 6,849,738 B2 | 2/2005 | Fukuoka et al. |
| 7,056,927 B2 | 6/2006 | Guo et al. |
| 7,176,211 B2 | 2/2007 | Guo et al. |
| 7,300,935 B2 | 11/2007 | Cho et al. |
| 7,419,983 B2 | 9/2008 | Guo et al. |
| 7,569,570 B2 | 8/2009 | Furuya et al. |
| 8,058,280 B2 | 11/2011 | Cho et al. |
| 8,735,401 B2 | 5/2014 | Cho et al. |
| 8,765,948 B2 | 7/2014 | Gallagher et al. |
| 9,346,822 B2 | 5/2016 | Cho et al. |
| 9,382,214 B2 | 7/2016 | Gallagher et al. |
| 9,422,310 B2 | 8/2016 | Beaton et al. |
| 9,427,418 B2 | 8/2016 | Dalton et al. |
| 9,624,161 B2 | 4/2017 | Dalton et al. |
| 9,758,528 B2 | 9/2017 | Fukuoka et al. |
| 9,949,974 B2 | 4/2018 | Goss et al. |
| 10,150,778 B2 | 12/2018 | Miwa |
| 10,350,170 B2 | 7/2019 | Yamane et al. |
| 10,449,191 B2 | 10/2019 | Rajasekhar et al. |
| 10,464,945 B2 | 11/2019 | Miwa |
| 10,544,160 B2 | 1/2020 | Miwa |
| 10,786,501 B2 | 9/2020 | Rajasekhar et al. |
| 11,033,551 B2 | 6/2021 | Johnson |
| 11,053,257 B2 | 7/2021 | Miwa |
| 11,583,526 B2 | 2/2023 | Rajasekhar et al. |
| 11,731,983 B2 | 8/2023 | Miwa |
| 11,793,812 B2 | 10/2023 | Johnson et al. |
| 11,795,178 B2 | 10/2023 | Fukuoka et al. |
| 11,957,684 B2 | 4/2024 | Johnson et al. |
| 12,097,198 B2 | 9/2024 | Rajasekhar et al. |
| 12,144,809 B1 | 11/2024 | Rajasekhar et al. |
| 12,180,224 B2 | 12/2024 | Fukuoka et al. |
| 12,325,714 B2 | 6/2025 | Miwa |
| 12,336,990 B2 | 6/2025 | Rajasekhar et al. |
| 12,338,249 B2 | 6/2025 | Brandl et al. |
| 2006/0160829 A1 | 7/2006 | Cho et al. |
| 2008/0108623 A1 | 5/2008 | Cho et al. |
| 2009/0048273 A1 | 2/2009 | Furuya et al. |
| 2009/0186890 A1 | 7/2009 | Gellert et al. |
| 2010/0331520 A1 | 12/2010 | Asami et al. |
| 2011/0172249 A1 | 7/2011 | Kamikawa et al. |
| 2014/0199236 A1 | 7/2014 | Chen et al. |
| 2014/0288031 A1 | 9/2014 | Chwalisz et al. |

(Continued)

FOREIGN PATENT DOCUMENTS

| | | |
|---|---|---|
| AU | 2011267798 B2 | 4/2015 |
| CA | 3 105552 C | 6/2023 |

(Continued)

OTHER PUBLICATIONS

AbbVie Pressroom (2016). AbbVie announces positive top-line results from second phase 3 study investigating Elagolix in patients with endometriosis, 3 total pages.
Ács, N. et al. (2015). "Treatment of endometriosis-associated pain with elagolix, an oral GnRH antagonist: Results from a phase 2, randomized controlled study," J. Endometri. Pelvic Pain Disorders 7:56-62.
Ács, N. et al. (2015). 703 Supplemental Material, 3 total pages.
Ács, N. et al. (2015). 703 Supplemental Figures and Tables, 9 total pages.
Activella Application No. NDA 20-970 (1998). Center for drug evaluation and research. Chemistry Reviews, 63 total pages.

(Continued)

Primary Examiner — Susan T Tran
(74) Attorney, Agent, or Firm — Cooley LLP

(57) ABSTRACT

The present disclosure includes combination solid oral dosage forms having 40 mg of N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, and hormone replacement medicaments. Also provided are processes for making and using the solid oral dosage forms.

12 Claims, 2 Drawing Sheets

(56) References Cited

U.S. PATENT DOCUMENTS

| | | |
|---|---|---|
| 2017/0320836 A1 | 11/2017 | Gallagher et al. |
| 2020/0000730 A1* | 1/2020 | Yamane .................. A61K 47/10 |
| 2020/0138819 A1 | 5/2020 | Loumaye et al. |
| 2021/0205303 A1 | 7/2021 | Rajasekhar et al. |
| 2021/0401841 A1 | 12/2021 | Johnson et al. |
| 2022/0135585 A1 | 5/2022 | Miwa |
| 2022/0204525 A1 | 6/2022 | Fukuoka et al. |
| 2022/0370462 A1 | 11/2022 | Johnson et al. |
| 2022/0372044 A1 | 11/2022 | Jagusch et al. |
| 2022/0396582 A1 | 12/2022 | Brandl et al. |
| 2022/0401443 A1 | 12/2022 | Rajasekhar et al. |
| 2023/0165800 A1 | 6/2023 | Alonzo et al. |
| 2023/0212184 A1 | 7/2023 | Fukuoka et al. |
| 2024/0165118 A1 | 5/2024 | Johnson et al. |
| 2025/0066382 A1 | 2/2025 | Vlahova et al. |
| 2025/0082632 A1 | 3/2025 | Rajasekhar et al. |

FOREIGN PATENT DOCUMENTS

| | | | |
|---|---|---|---|
| CN | 1072338 A | 5/1993 | |
| CN | 1107516 A | 8/1995 | |
| EC | SP-96-1635 A | 6/1997 | |
| EC | SP-97-1998 A | 4/1998 | |
| EC | SP-06-6999 A | 12/2006 | |
| EP | 0 748 190 A1 | 12/1996 | |
| EP | 1 066 041 A1 | 1/2001 | |
| EP | 2 329 823 A1 | 6/2011 | |
| JP | H-08-295693 A | 11/1996 | |
| JP | 2001-278884 A | 10/2001 | |
| JP | 2003-292492 A | 10/2003 | |
| JP | 2004-250439 A | 9/2004 | |
| JP | 2012-077020 A | 4/2012 | |
| JP | 2019-529575 A | 10/2019 | |
| TW | 284688 B | 9/1996 | |
| TW | I332847 B | 11/2010 | |
| WO | WO-2004/067535 A1 | 8/2004 | |
| WO | WO-2005/105103 A2 | 11/2005 | |
| WO | WO-2005/105103 A3 | 11/2005 | |
| WO | WO-2010/026993 A1 | 3/2010 | |
| WO | WO-2011/156908 A1 | 12/2011 | |
| WO | WO-2014/051164 A2 | 4/2014 | |
| WO | WO-2014/051164 A3 | 4/2014 | |
| WO | WO-2014/143669 A1 | 9/2014 | |
| WO | WO-2017/040841 A1 | 3/2017 | |
| WO | WO-2018/060463 A2 | 4/2018 | |
| WO | WO-2018/060463 A3 | 4/2018 | |
| WO | WO-2018/060501 A2 | 4/2018 | |
| WO | WO-2018/060501 A3 | 4/2018 | |
| WO | WO-2020094698 A2 * | 5/2020 | ............. A61K 31/57 |
| WO | WO-2021/239917 A1 | 12/2021 | |
| WO | WO-2022/101303 A1 | 5/2022 | |
| WO | WO-2023/066941 A1 | 4/2023 | |

OTHER PUBLICATIONS

Activella ® Highlights of Prescribing Information (2013). 10 total pages.

Al-Azemi, M. et al. (2009). "Immediate and delayed add-back hormonal replacement therapy during ultra long GnRH agonist treatment of chronic cyclical pelvic pain," BJOG 116:1646-1656.

Al-Hendy, A. et al. (2017). "Uterine fibroids: Burden and unmet medical need," Semin. Reprod. Med. 35:473-480.

Al-Hendy, A. et al. (2019). "Treatment of symptomatic uterine fibroids with Relugolix combination therapy—Efficacy and safety results from two double-blind, randomized, placebo-controlled phase 3 clinical trials," ASRM Presentation, 23 total pages.

Al-Hendy, A. et al. (2020). "LIBERTY: Long-term extension study demonstrating one-year efficacy and safety of Relugolix combination therapy in women with symptomatic uterine fibroids," ASRM Presentation, 18 total pages.

Al-Hendy, A. et al. (2019). "Treatment of symptoms of uterine fibroids with relugolix combination therapy: efficacy and safety; results from the Phase 3 LIBERTY 1 clinical trial," Fertility and Sterility 112:E434.

Al-Hendy, A. et al. (2020). "Quality of life improvement with Relugolix combination therapy in patients with heavy menstrual bleeding associated with uterine fibroids: Results from the liberty Phase 3 program," Fertility and Sterility 114:e85, O-205 presented at ASRM 2020.

American Society for Reproductive Medicine (2011). "Noncontraceptive benefits of birth control pills," 1 total page.

Archer, D.F. et al. (2015). "Elagolix for the management of heavy menstrual bleeding associated with uterine fibroids: Results from a Phase 2A proof-of-concept study," 19 total pages.

Archer, D.F. et al. (2017). "Elagolix for the management of heavy menstrual bleeding associated with uterine fibroids: Results from a phase 2a proof-of-concept study," Fertility and Sterility 108:152-160, with Supplemental Figures 1-3 and Materials, 28 total pages.

Archer, D.F. et al. (2020). "Elagolix suppresses ovulation in a dose-dependent mnner: Results from a 3-month, randomized study in ovulatory women," J. Clin. Endocrinol. Metab. 105:821-832.

As-Sanie, S. et al. (2020). "Efficacy and safety of Relugolix combination therapy in women with endometriosis-Associated pain: Phase 3 randomized, double-blind, placebo-controlled study (SPIRIT 2)," Fertility and Sterility 114:e77, O-187 presented at 76th American Society for Reproductive Medicine Virtual Scientific Congress & Expo.

Barbieri, R.L. (1992). "Hormone treatment of endometriosis: the estrogen threshold hypothesis," Am. J. Obstet. Gynecol. 166:740-745.

Batzer, F.R. (2006). "GnRH agonist and antagonist: Options for endometriosis pain treatment," Thomas Jefferson University, Department of Obstetrics and Gynecology Faculty Papers, pp. 1-20.

Bedaiwy, M.A. et al. (2006). "Treatment with leuprolide acetate and hormonal add-back for up to 10 years in stage IV endometriosis patients with chronic pelvic pain," Fertil. Steril. 86:220-222.

Becker, C.M. et al. (2021). "The effect of time since surgical diagnosis of endometriosis on treatment outcomes with Relugolix combination therapy in women with Endometriosis-associated pain: SPIRIT Program," Presented at the European Society of Human Reproduction and Embryology (ESHRE), 37th Annual Meeting, Jun.-Jul. 2021, 13 total pages.

Becker, C.M. et al. (2017). "Revaluating response and failure of medical treatment of endometriosis: A systemic review," Fertility and Sterility 108:125-136.

Bulun, S.E. (2013). "Uterine fibroids," N. Engl. J. Med. 369:1344-1355.

Carr, B. et al. (2013). "Elagolix, an oral GnRH antagonist for endometriosis-associated pain: A randomized controlled study," J. Endometrio. Pelvic Pain Dis. 5:105-115.

Carr, B. et al. (2014). "Elagolix, an oral GnRH antagonist, versus subcutaneous depot medroxyprogesterone acetate for the treatment of endometriosis: effects on bone mineral density," Reprod. Sci. 21:1341-1351.

Carr, B. et al. (2014). "Elagolix, an oral GnRH antagonist, versus subcutaneous depot medroxyprogesterone acetate for the treatment of endometriosis: effects on bone mineral density," Reprod. Sci. 21:1341-1351, Supplemental Material.

Center for Drug Evaluation and Research (2018). Application No. 210450Orig1s000, Elagolix Ovulation Rate.

Chen, C. et al. (2008). "Discovery of sodium R-(+)-4-{2-[5-(2-fluoro-3-methoxyphenyl)-3-(2-fluoro-6- [trifluoromethyl]benzyl)-4-methyl-2,6-dioxo-3,6-dihydro-2H-pyrimidin-1-yl]-1-phenylethylamino}butyrate (elagolix), a potent and orally available nonpeptide antagonist of the human gonadotropin-releasing hormone receptor," J. Med. Chem. 51:7478-7485.

ClinicalTrials.gov (2016). Bioavailability and Effect of Food on TAK-385 Tablet Formulations in Healthy Participants—Study Results—ClinicalTrials.gov, located at https://www.clinicaltrials.gov/ct2/show/results/NCT02396147?term=relugolix&rank=9, 14 total pages.

ClinicalTrials.gov. (2017). Liberty 1: Efficacy & safety study of Relugolix in women with heavy menstrual bleeding associated with uterine fibroids. Identifier NCT03049735, 6 total pages.

(56) References Cited

OTHER PUBLICATIONS

ClinicalTrials.gov. (2017). Liberty 2: Efficacy & safety study of Relugolix in women with heavy menstrual bleeding associated with uterine fibroids. Identifier NCT03103087, 6 total pages.
ClinicalTrials.gov. (2017). Spirit 1: Efficacy and safety study of Relugolix in women with Endometriosis-associated pain. Identifier NCT03204318, 6 total pages.
ClinicalTrials.gov. (2017). Spirit 2: Efficacy and safety study of Relugolix in women with Endometriosis-associated pain. Identifier NCT03204331, 6 total pages.
ClinicalTrials.gov. (2013). Efficacy and safety of TAK-385 in the treatment of uterine fibroids. Identifier NCT01452659, 8 total pages.
ClinicalTrials.gov. (2016). A placebo-controlled, phase 3 study of TAK-385 40 mg in the treatment of pain symptoms associated with uterine fibroids. Identifier NCT02655224, 6 total pages.
ClinicalTrials.gov. (2014). Efficacy and safety of TAK-385 in the treatment of endometriosis. Identifier NCT01458301, 7 total pages.
ClinicalTrials.gov. (2014). A long-term extension study of TAK-385 in the treatment of endometriosis. Identifier NCT01452685, 6 total pages.
ClinicalTrials.gov. (2016). A phase 3 study to evaluate the efficacy and safety of TAK-385 40 mg compared with leuprorelin in the treatment of uterine fibroids. Identifier NCT02655237, 8 total pages.
ClinicalTrials.gov. (2014). Safety and efficacy pre-menopausal women with heavy uterine bleeding and uterine fibroids. Identifier NCT01441635, 10 total pages.
ClinicalTrials.gov. (2018). Liberty Extension: Efficacy and safety extension study of Relugolix in women with heavy menstrual bleeding associated with uterine fibroids, Identifier NCT03412890, 9 total pages.
ClinicalTrials.gov. (2018). Spirit Extension: Efficacy and safety extension study of Relugolix in women with endometriosis-associated pain, Identifier NCT03654274, 10 total pages.
ClinicalTrials.gov. (2020). Liberty 1: Efficacy & safety study of Relugolix in women with heavy menstrual bleeding associated with uterine fibroids. Identifier NCT03049735, 12 total pages.
ClinicalTrials.gov. (2020). Liberty 2: Efficacy & safety study of Relugolix in women with heavy menstrual bleeding associated with uterine fibroids. Identifier NCT03103087, 12 total pages.
ClinicalTrials.gov (2016). History of Changes for Study NCT02655237, first posted on Jan. 13, 2016, 14 total pages.
ClinicalTrials.gov (2016). History of Changes for Study NCT02655224, first posted on Jan. 13, 2016, 12 total pages.
ClinicalTrials.gov (2017). History of Changes for Study NCT03204318, last update submitted Jun. 28, 2017, and posted on Jul. 2, 2017, 10 total pages.
ClinicalTrials.gov (2017). History of Changes for Study NCT03204331, last update submitted Jun. 28, 2017, and posted on Jul. 2, 2017, 8 total pages.
Corrected Notice of Allowability mailed on Apr. 17, 2019, for U.S. Appl. No. 15/553,852, filed Aug. 25, 2017, 4 pages.
Cramer, D.W. et al. (2002). "Determinants of early follicular phase gonadotrophin and estradiol concentrations in women of late reproductive age," Hum. Reprod. 17:221-227.
Diamond, M.P. et al. (2014). "Elagolix treatment for endometriosis-associated pain: results from a phase 2, randomized, double-blind, placebo-controlled study," Reprod. Sci. 21:363-371.
Duijkers, I. et al. (2020). "Characterization of pituitary and ovarian hormone concentration during treatment with Relugolix combination therapy," ASRM Presentation, 12 total pages.
Duijkers, I.J.M. et al. (2020). "Inhibition of ovulation during co-administration of the once-daily, oral gonadotropin-releasing hormone receptor antagonist, Relugolix, with estradiol and norethindrone acetate in healthy premenopausal women," Presentation Poster, 1 total page.
Dunselman, G.A.J. et al. (2014). "ESHRE guideline: management of women with endometriosis," Hum. Reprod. 29:400-412.

Ehlers, K. et al. (2013). "Gonadotropin-releasing hormone (GnRH) and the GnRH receptor (GnRHR)," The Global library of women's medicine, 7 total pages.
Ettinger, B. et al. (2012). "The effect of Elagolix, a novel, orally active GnRH antagonist, on bone mineral density (BMD) in women with endometriosis," The Endocrine Society's 94th Annual Meeting and Expo, Jun. 23-26, 2012, Houston, TX., 1 total page.
FemHRT™ (1999). Center for drug evaluation and research. Application No. 21-065. Clinical pharmacology and biopharmaceutics review(s), 44 total pages.
FemHRT™ (1999). Center for drug evaluation and research. Application No. 21-065. Medical review(s), 46 total pages.
Fernandez, H. et al. (2004). "One year comparison between two add-back therapies in patients treated with a GnRH agonist for symptomatic endometriosis: A randomized double-blind trial," Human Reprod. 19:1465-1471.
Final Office Action mailed on Jun. 12, 2018, for U.S. Appl. No. 15/553,852, filed on Aug. 25. 2017, 9 pages.
Finkelstein, J.S. et al. (2008). "Bone mineral density changes during the menopause transition in a multiethnic cohort of women," J. Clin. Endocrinol. Metab. 93:861-868.
Form S-1 Registration Statement under the Securities Act of 1933, Myovant Sciences Ltd., Sep. 30, 2016, pp. 1-209, filing details located at https://www.sec.gov/Archives/edgar/data/1679082/000119312516727309/0001193125-16-727309-index.htm, 209 total pages.
Friedman, A.J. et al. (1993). "A prospective, randomized trial of gonadotropin-releasing hormone agonist plus estrogen-progestin or progestin "add-back" regimens for women with leiomyomata uteri," J. Clin. Endocrinol. Metab. 76:1439-1445.
Friedman, A.J. et al. (1994). "Long-term medical therapy for leiomyomata uteri: a prospective, randomized study of leuprolide acetate depot plus either oestrogen-progestin or progestin 'add-back' for 2 years," Hum. Reprod. 9:1618-1625.
Friedman, A.J. et al. (1990). "Efficacy and safety considerations in women with uterine leiomyomas treated with gonadotropin-releasing hormone agonists: The estrogen threshold hypothesis," Am. J. Obstet. Gynecol. 163:1114-1119.
Fuldeore, M.J. et al. (2010). "Add-back therapy use and its impact on LA persistence in patients with endometriosis," Curr. Med. Res. Opin. 26:729-736.
Gonzales, M. et al. (2012). "Patients with adenomyosis are more likely to have deep endometriosis," Gynecol. Surg. 9:259-264.
Grundy, J. et al. (2008). "The pharmacokinetics (PK) and pharmacodynamics (PD) of an orally activegonadotropin-releasing hormone (GNRH) antagonist (NBI-56418) with once daily and sipping dose regimens in healthy premenopausal women," Abstract PIII-72, 83(Suppl. 1):S94.
Hornstein, M.D. et al. (1998). "Leuprolide acetate depot and hormonal add-back in endometriosis: a 12-month study. Lupron Add-Back Study Group," Obstet. Gynecol. 91:16-24.
Hoshiai, H. et al. (2017). "Phase 2 study of Relugolix vs placebo in heavy menstrual bleeding associated with uterine fibroids," Presented at ACOG. Obstet. Gynecol. 87S:29.
Imani, R. et al. (2009). "Petal study: Safety, tolerability and effectiveness of elagolix, an oral GNRH antagonist for endometriosis," Fertility & Sterility P-81, p. S111.
International Search Report mailed on May 31, 2016, for PCT Application No. PCT/JP2016/055540, filed on Feb. 25, 2016, 9 pages (with English translation).
International Search Report mailed on Apr. 4, 2018, for PCT Application No. PCT/EP2017/074907, filed on Sep. 29, 2017, 6 pages.
International Search Report mailed on Sep. 9, 2021, for PCT Application No. PCT/EP2021/064280, filed on May 27, 2021, 3 pages.
Jayasena, C.N. et al. (2014). "Kisspeptin-54 triggers egg maturation in women undergoing in vitro fertilization," J. Clin. Invest. 124:3667-3677.
Johnson, N.P. et al. (2013). "Consensus on current management of endometriosis," Human Reproduction 28:1552-1568.

(56) References Cited

OTHER PUBLICATIONS

Johnson, N.P. et al. (2017). "World endometriosis society consensus on the classification of endometriosis," Human Reproduction 32:315-324.

Kim, N.Y. et al. (2010). "The efficacy and tolerability of short-term low-dose estrogen-only add-back therapy during post-operative GnRH agonist treatment for endometriosis," *Eur. J. Obstet. Gynecol. Reprod. Biol.* 154:85-89.

Kuhnz, W. et al. (1997). "In vivo conversion of norethisterone and norethisterone acetate to ethinyl etradiol in postmenopausal women," *Contraception* 56:379-385.

KUSM-W Department of Obstetrics and Gynecology (2016). Research and QI Update, vol. 1, Issue 1, 4 total pages.

KUSM-W (2015). "Research, quality improvement, and clinical research update," Presentation slides, 37 total pages.

Kuznetsov, L. et al. (2017). "Diagnosis and management of endometriosis: Summary of NICE guidance," BMJ 358:j3935.

Lee, J.Y. et al. (2015). "Effects of Hormone Therapy on Serum Lipid Levels in Postmenopausal Korean Women," *J. Menopausal Med.* 21:104-111.

Lee, D.Y. et al. (2016). "Effects of different add-back regimens on hypoestrogenic problems by postoperative gonadotropin-releasing hormone agonist treatment in endometriosis," *Obstet. Gynecol. Sci.* 59:32-38.

Lukes, A. et al. (2021). "Once-daily Relugolix combination therapy results in sustained reduction in symptoms and improved quality of life in women with uterine fibroids treated over 52 weeks," Presented at the European Society of Human Reproduction and Embryology (ESHRE) 2021, 37$^{th}$ Annual Meeting, Jun. 26-Jul. 1, 2021, 15 total pages.

Lukes et al., "Pharmacokinetics, pharmacodynamics, and safety of relugolix, a potent oral once-daily gonadotropin-releasing hormone (GnRH) receptor antagonist, as monotherapy and in combination with estradiol/norethindrone acetate add-back therapy," Human Reproduction 32: i267-i268, 2017 (abstr).

Lupron Medical Review Part 1 (2001). Application No. 20-708/S-011 Medical reviews. NDA 20-011/S021 and NDA 20-708/s011, 43 total pages.

Lupron Medical Review Part 2 (2001). NDA 20-011/s021 & NDA 20-708/s011, 42 total pages.

Lupron Medical Review Part 3 (2001). NDA 20-011/s021 & NDA 20-708/s011, 42 total pages.

McLaren, J.S. et al. (2012). "Gonadotrophin receptor hormone analogues in combination with add-back therapy: an update," Menopause International 18:68-72.

Mizutani, T. e al. (2005). "Effect of steroid add-back therapy on the proliferative activity of uterine leiomyoma cells under gonadotropin-releasing hormone agonist therapy," *Gynecol. Endocrinol.* 20:80-83.

Miwa, K. et al. (2011). "Discovery of 1-{4-[1-(2,6-difluorobenzyl)-5-[(dimethylamino)methyl]-3-(6- methoxypyridazin-3-yl)-2,4-dioxo-1,2,3,4-tetrahydrothieno[2,3-d]pyrimidin-6-yl]phenyl}-3-methoxyurea (TAK-385) as a potent, orally active, non-peptide antagonist of the human gonadotropin-releasing hormone receptor," *J. Med. Chem.* 54:4998-5012.

Moroni, R.M. et al. (2015). "Add-back therapy with GnRH analogues for uterine fibroids (review)," Cochrane Library, 78 total pages.

Myovant Sciences (2019). Press Release: "Myovant Sciences announces positive results from second phase 3 study evaluating one-daily Religolix combination therapy in women with uterine fibroids and positive results from Bioequivalence study," 3 total pages.

Myovant Sciences (2019). Press Release: "Myovant Sciences announces late-breaking oral presentation of phase 3 Liberty 1 & 2 study results at 2019 American Society for reproductive medicine scientific congress," 2 total pages.

Myovant Sciences (2021). Press Release: "Myovant Sciences and Pfizer announce positive one-year data from phase 3 SPITIT extension study of once-daily Relugolix combination therapy in Women with Endometriosis," 3 total pages.

Myovant Sciences (2017). Press Release: "Myovant Sciences Announces Presentation of Positive Phase 2 Data for Relugolix in Women with Heavy Menstrual Bleeding and Uterine Fibroids at the Annual Meeting of the American Congress of Obstetricians and Gynecologists," 2 total pages.

Myovant Sciences Press Release (2020). "Myovant Sciences and Gedeon Richter enter into exclusive license agreement to commercialize Relugolix combination tablet for uterine fibroids and endometriosis in certain territories outside the U.S.," located at https://investors.myovant.com/news-releases/news-release-details/myovant-sciences-and-gedeon-richter-enter-exclusive-license, 2 total pages.

Myovant Sciences Press Release (2020). "Myovant Sciences announces 88% one-year response rate in positive phase 3 Liberty extension study of once-daily Relugolix combination therapy in women with uterine fibroids," located at https://investors.myovant.com/news-releases/news-release-details/myovant-sciences-announces-88-one-year-response-rate-positive, 2 total pages.

Myovant Sciences Press Release (2020). "Myovant Sciences announces positive results from Phase 3 SPIRIT 2 study evaluating once-daily Relugolix combination therapy in women with Endometriosis and from ovulation inhibition study," located https://investors.myovant.com/news-releases/news-release-details/myovant-sciences-announces-positive-results-phase-3-spirit-2/, 3 total pages.

Nakata, D. et al. (2014). "Suppression of the hypothalamic-pituitary-gonadal axis by TAK-385 (relugolix), a novel, investigational, orally active, small molecule gonadotropin-releasing hormone (GnRH) antagonist: studies in human GnRH receptor knock-in mice," *Eurp. J. Pharmacol.* 723:167-174.

Ng, J.W. et al. (2016). "Dose-dependent suppression of gonadotropins and ovarian hormones by elagolix in healthy premenopausal females," S-200, 2 total pages.

Non-Final Office Action mailed on Jan. 25, 2018, for U.S. Appl. No. 15/553,852, filed Aug. 25, 2017, 7 pages.

Non-Final Office Action mailed on May 14, 2020, for U.S. Appl. No. 16/432,091, filed Jun. 5, 2019, 13 pages.

Notice of Allowance mailed on Mar. 27, 2019, for U.S. Appl. No. 15/553,852, filed Aug. 25, 2017, 7 pages.

Notice of Allowance mailed on Mar. 31, 2021, for U.S. Appl. No. 16/370,299, filed Mar. 29, 2019, 18 pages.

Opposition filed by Sandoz AG on Dec. 15, 2022, against EP Application No. 17 823 018.1, Myovant Sciences GmbH et al., 42 total pages.

Oral and Transdermal estrogen dose equivalents (2012), 1 total page.

Osuga, Y. et al. (2020). "Relugolix, an oral gonadotropin-releasing hormone receptor antagonist, reduces endometriosis-associated pain in a dose-response manner: a randomized, double-blind, placebo-controlled study," Fertil. Steril. 7:S0015-0282(20)30716-0, 8 total pages.

PCT Request for Application No. PCT/EP2017/074907, filed on Sep. 29, 2017, 6 total pages.

Perez-Lopez, F.R. et al. (2014). "EMAS position statement: Management of uterine fibroids," Maturitas 79:106-116.

PR Newswire (2014). Endometriosis opportunity analysis and forecasts to 2017, located at https://www.prnewswire.com/news-releases/opportunityanalyzer-endometriosis---opportunity-analysis-and-forecasts-to-2017-244856221.html, 4 total pages.

Practice Committee of the American Society for Reproductive Medicine (2014). "Treatment of pelvic pain associated with endometriosis: A committee opinion," *Fertility & Sterility* 101:927-935.

Replacement Extended European Search Report mailed on Nov. 12, 2018, for EP Application No. 16 755 593.7, filed on Feb. 25, 2016, 9 pages.

Riggs, M.M. et al. (2012). "Integrated pharmacometrics and systems pharmacology model-based analyses to guide GnRH receptor modulator development for management of endometriosis," *CPT Pharmacometrics Syst. Pharmacol.* 1:e11.

Riggs, M.M. et al. (2011). "Application of a multiscale physiologically-based bone and calcium systems model to guide the development of

(56) References Cited

OTHER PUBLICATIONS

GnRH receptor modulators for the management of endometriosis," American Conference on Pharmacometrics Poster, Apr. 3-7, 2011, San Diego, CA., 1 total page.
Rowe, R.C. et al. (2009). "Mannitol," in Academy of Pharmaceutical Sciences and Royal Pharmaceutical Society of Great Britain. Handbook of Pharmaceutical Excipients 6th Edition, Washington, D.C: American Pharmaceutical Association, p. 424.
Speroff, L. et al. (2000). "The effect of varying low-dose combinations of norethindrone acetate and ethinyl estradiol (femhrt) on the frequency and intensity of vasomotor symptoms," Menopause 7:383-390.
Streuli, I. et al. (2012). "New treatment strategies and emerging drugs in endometriosis," Expert Opinion on Emerging Drugs 17:83-104.
Sriprasert, I. et al. (2017). "Heavy menstrual bleeding diagnosis and medical management," Contraception and Reproductive Medicine 2:20, 8 total pages.
Stricker, R. et al. (2006). "Establishment of detailed reference values for luteinizing hormone, follicle stimulating hormone, estradiol, and progesterone during different phases of the menstrual cycle on the Abbott Architect® analyzer," Clin. Chem. Lab. Med. 44:883-887.
Struthers, R.S. et al. (2009). "Suppression of gonadotropins and estradiol in premenopausal women by oral administration of the nonpeptide gonadotropin-releasing hormone antagonist elagolix," *J. Clin. Endocrinol. Metab.* 94:545-551.
Takeda Press Release. (2016). Roivant sciences and Takeda launch Myovant Sciences to development innovative therapeutics for women's health and prostate cancer, located at https://www.takeda.com/newsroom/newsreleases/2016/roivant-sciences-and-takeda-launch-myovant- sciences-to-develop-innovative-therapeutics-for-womens-health-and-prostate-cancer/, 2 total pages.
Tanaka, A. et al. (2009). "Pharmacological profile of TAK-385, an orally active gonadotropin releasing hormone (GNRH) antagonist," *Fertility & Sterility* P-86, p. S113.
Taylor, H.S. et al. (2017). "Treatment of endometriosis-associated pain with elagolix, an oral GnRH antagonist," N. Engl. J. Med. 377:28-40.
Taylor, A.K. (2009). "Glyceryl Stearate," in Academy of Pharmaceutical Sciences and Royal Pharmaceutical Society of Great Britain. Handbook of Pharmaceutical Excipients 6th Edition, Washington, D.C: American Pharmaceutical Association, Edited by Raymond Rowe et al., pp. 290-293.
Todd, T. et al. (2007). "Newly diagnosed iron deficiency anaemia in a premenopausal woman," BMJ 334:259.
United States Securities and Exchange Commission, Form 10-Q, Quarterly Report Pursuant to Section 13 or 15(d) of the Securities Exchange Act of 1934, Myovant Sciences, Feb. 13, 2017, pp. 1-68, filing details located at https://www.sec.gov/Archives/edgar/data/1679082/000167908217000005/0001679082-17-000005-index.htm.
Weisan, P. (2010). China Medicine Science and Technology Press, Industrial Pharmaceutics, 2nd edition, pp. 86-87 (with English translation).
Wessler, J.D. et al. (2013). "The P-glycoprotein transport system and cardiovascular drugs," *J. Am. Coll. Cardiol.* 61:2495-2502.
Wikipedia Article (2022). Form S-1, 1 total page.
Wise, L.A. et al. (2016). "Epidemiology of uterine fibroids—from menarche to menopause," Clin. Obstet. Gynecol. 59:2-24.
Written Opinion of the International Searching Authority mailed on May 31, 2016, for PCT Application No. PCT/JP2016/055540, filed on Feb. 25, 2016, 13 pages (with English translation).
Written Opinion of the International Searching Authority mailed on Apr. 4, 2018, for PCT Application No. PCT/EP2017/074907, filed on Sep. 29, 2017, 14 pages.
Written Opinion of the International Searching Authority mailed on Sep. 9, 2021, for PCT Application No. PCT/EP2021/064280, filed on May 27, 2021, 8 pages.
Wu, D. et al. (2014). "Clinical efficacy of add-back therapy in treatment of endometriosis: a meta-analysis," *Arch. Gynecol. Obstet.* 290:513-523.
Zheng, J. (2009). "Formulation and analytical development for low-dose oral drug products," pp. 19, 35 and 76.
U.S. Appl. No. 62/402,150, filed Sep. 30, 2016, by Ditzler, 195 total pages.
U.S. Appl. No. 62/528,409, filed Jul. 3, 2017, by Ditzler, 23 total pages.
U.S. Appl. No. 62/492,839, filed May 1, 2017, by Rajasekhar et al., 515 total pages.
U.S. Appl. No. 62/402,055, filed Sep. 30, 2016, by Rajasekhar et al., 268 total pages.
U.S. Appl. No. 62/402,034, filed Sep. 30, 2016, by Rajasekhar et al., 212 total pages.
Yao, J. (Aug. 2011). Chapter 1: Formative excipients of preparations, in Guidelines for Application of Pharmaceutical Excipients, China Medical Science and Technology Press, Beijing, Molding Excipients for Preparations, pp. 80-81 (with English translation).
Fu, C. (Oct. 2008). Science of Pharmaceutical Excipients, China Traditional Chinese Medicine Press, Beijing, pp. 150 and 209 (with English translation).
ClinicalTrials. Gov (Jan. 31, 2020). "Study of Relugolix with Estradiol and Norethindrone acetate in women with heavy menstrual bleeding associated with uterine fibroids," NCT03751124, 16 pages.
Lopes, C.M. et al. (2007). AAPS PharmaSciTech 8(3):E1-E8.
Pluchino, N. et al. (2015). "Innovations in classical hormonal targets for endometriosis," Expert Rev. Clin. Pharmacol. 9(2):317-327.
*Sumitomo Pharma Switzerland GmbH et al v. Apotex Inc et al*, 1:25-cv-00311 (D. Del.), filed on Mar. 12, 2025.
*Sumitomo Pharma Switzerland GmbH et al v. Cipla Ltd et al*, 1:25-cv-00312 (D. Del.), filed on Mar. 12, 2025.
*Sumitomo Pharma Switzerland GmbH et al v. Hetero Labs Ltd et al*, 1:25-cv-00344 (D. Del.), filed on Mar. 19, 2025.
*Sumitomo Pharma Switzerland GmbH et al v. Aizant Drug Research Sols. Pvt. Ltd.*, 1:25-cv-00343 (D. Del.), filed on Mar. 19, 2025.
*Sumitomo Pharma Switzerland GmbH et al v. MSN Labs. Pvt. Ltd., et al*, 1:25-cv-00345 (D. Del.), filed on Mar. 19, 2025.
*Sumitomo Pharma Switzerland GmbH et al v. Annora Pharma Pvt. Ltd., et al*, 1:25-cv-00380 (D. Del.), filed on Mar. 27, 2025.
U.S. Appl. No. 18/926,157, filed Oct. 24, 2024, by Johnson et al.
U.S. Appl. No. 19/228,661, filed Jun. 4, 2025, by Johnson et al.
U.S. Appl. No. 19/201,728, filed May 7, 2025, by Fukuoka et al.
U.S. Appl. No. 19/264,673, filed Jul. 9, 2025, by Rajasekhar et al.
U.S. Appl. No. 19/212,513, filed May 19, 2025, by Brandl et al.
U.S. Appl. No. 19/086,039, filed Mar. 20, 2025, by Migoya et al.
Al-Hendy, A. et al. (2022). "Long-term Relugolix combination therapy for symptomatic uterine leiomyomas," Obstet. Gynecol. 140:920-930.
Attar, R. et al. (Aug. 2015). "Experimental treatments of endometriosis," Women's Health (Lond). 11(5):653-664.
Bulun, S.E. et al. (2019). "Endometriosis," Endocrine Reviews 40:1048-1079.
Chwalisz, K. et al. (2013). "Fibroids," First Edition, edited by James H. Segars, John Wiley & Sons, Ltd., Chapter 6 entitled "Medical Management of Women with Symptomatic Uterine Fibroids," pp. 61-75.
ClinicalTrials.Gov (Jan. 6, 2015). "Safety and efficacy of TAK-385 for patients with localized prostate cancer," NCT02135445, 13 pages.
Duijkers, I. et al. (2020). "Characterization of Pituitary and Ovarian Hormone Concentrations During Treatment with Relugolix Combination Therapy," Abstract O-196. Oral presented at the American Society for Reproductive Medicine (ASRM) Scientific Congress & Expo; Oct. 17-21, 2020, 1 total page.
EP Application No. 17 823 018.1, Consolidated Cited References List, Proprietor Myovant Sciences GmbH et al., Opponent Sandoz AG, Feb. 22, 2024, 3 pages.
EP Application No. 17 823 018.1, Brief Communication Regarding Proprietor, Myovant Sciences GmbH et al. Written Submission with Main Request and Auxiliary Requests 1 to 5, dated Feb. 28, 2024, 50 pages.

(56) References Cited

OTHER PUBLICATIONS

EP Application No. 17 823 018.1, Communication Regarding Opponent, Sandoz AG Written Submission dated Feb. 28, 2024, 14 pages.
EP Application No. 17 823 018.1, Interlocutory Decision in Opposition Proceedings, mailed to Proprietor Myovant Sciences GmbH et al., EP No. 3 518 933, dated May 29, 2024, 377 pages.
EP Application No. 17 823 018.1, Interlocutory Decision in Opposition Proceedings, mailed to Opponent Sandoz AG, EP No. 3 518 933, dated May 29, 2024, 377 pages.
EP Application No. 17 823 018.1, Brief Communication Regarding Preparation of Oral Proceedings to be Held on Apr. 24, 2024 (Proprietor, Myovant Sciences GmbH et al.), dated Mar. 28, 2024, 21 pages.
European Pharmacopeia 6.0, Section 2.9.31, Jul. 23, 2007, pp. 311-314.
Extended European Search Report mailed on Nov. 3, 2022, for EP Application No. 22 162 349.9, filed on Sep. 29, 2017, 8 pages.
Handbook of Pharmaceutical Excipients (2009). Sixth Edition, Ed. R.C. Rowe, Pharmaceutical Press, Entries for hydroxypropyl cellulose, mannitol, magnesium stearate and sodium starch glycolate, pp. 317-321, 404-407, 424-428, 663-666.
ISO 13320-01, First Edition, Nov. 1, 1999, 40 pages.
Maclean, D.B. et al. (2015). "Medical Castration Using the Investigational Oral GnRH Antagonist TAK-385 (Relugolix): Phase 1 Study in Healthy Males," Journal of Clinical Endocrinology and Metabolism 100:4579-4587.
Myfembree® (May 2021). U.S. Prescribing Information, 32 pages.
Non-Final Office Action mailed on Jul. 14, 2023, for U.S. Appl. No. 17/866,201, filed Jul. 15, 2022, 20 pages.
Notice of Allowance mailed on Aug. 16, 2023, for U.S. Appl. No. 17/317,769, filed May 11, 2021, 18 pages.
Notice of Allowance mailed on Nov. 1, 2023, for U.S. Appl. No. 17/866,201, filed Jul. 15, 2022, 13 pages.
Notice of Allowance mailed on Mar. 14, 2024, for U.S. Appl. No. 17/866,201, filed Jul. 15, 2022, 6 pages.
Ohrem, H.L. et al. (2014). "Why is mannitol becoming more and more popular as a pharmaceutical excipient in solid dosage forms?" Pharm. Dev. Technol. 19(3):257-262.
Pahwa, R et al. (2011). "Superdisintegrants in the development of orally disintegrating tablets: A review," IJPSR 2(11):2767-2780.
Pearlitol® 100 SD Mannitol Product Profile, 2024.
Pearlitol® 100 SD Product Specification Sheet, 2024.
Pearlitol® 200 SD Mannitol Product Profile, 2024.
Protocol of the Clinical Trial NCT01817530 entitled "Safety and efficacy in premenopausal women with heavy menstrual bleeding (HMB) associated with uterine fibroids (UF)," Version 14, Jun. 15, 2016, 9 pages.
Protocol of the Clinical Trial NCT02654054 entitled "Efficacy and safety of Elagolix in combination with Estadiol/Norethindrone Acetate for the management of heavy menstrual bleeding associated with uterine fibroids in premenopausal women," Version 3, Jul. 27, 2016, 12 pages.
Protocol of the Clinical Trial NCT02691494 entitled "Efficacy and safety of Elagolix in combination with Estadiol/Norethindrone Acetate for the management of heavy menstrual bleeding associated with uterine fibroids in premenopausal women (replicate study)," Version 3, Aug. 1, 2016, 10 pages.
Remington Essentials of Pharmaceuticals (2013). Ed. L.A. Felton, Pharmaceutical Press, Chapters 30, 31, and 36.
Troubleshooting and FAQs for Pearlitol® Mannitol, 2024, First Question Expanded.
Troubleshooting and FAQs for Pearlitol® Mannitol, 2024, Twenty-third Question Expanded.
U.S. Pharmacopeia, Section <429>, May 1, 2015, 6 pages.
U.S. Appl. No. 18/392,110, filed Dec. 21, 2023, 2023, by Migoya et al.
U.S. Appl. No. 18/427,033, filed Jan. 30, 2024, by Johnson et al.
U.S. Appl. No. 18/636,642, filed Apr. 16, 2024, by Vlahova et al.
U.S. Appl. No. 18/758,904, filed Jun. 28, 2024, by Rajasekhar et al.
U.S. Appl. No. 18/792,752, filed Aug. 2, 2024, by Rajasekhar et al.
U.S. Appl. No. 18/797,045, filed Aug. 7, 2024, by Migoya et al.
Harding, GH et al. (2008). "The responsiveness of the uterine fibroid symptom and health-related quality of life questionnaire (UFS-QOL)," Health of Quality of Life Outcomes 6:99, 8 total pages.
Negre, J.M.S. (Date Unknown). "New galenic contributions to methods of administration," Continuing Education for Hospital Pharmacists, 57 total pages (with English Translation).
UCLA Health (2019). Uterine fibroid symptom & health-related quality of life questionnaire (UFS-QOL), located at https://www.uclahealth.org/sites/default/files/documents/Fibroid-Questionnaire-2019.pdf, 3 total pages.
Wikipedia Article (2023). "Medication," located at https://en.wikipedia.org/wiki/Medication, 19 total pages.
Al-Hendy, A. et al. (2021). "Treatment of uterine fibroid symptoms with relugolix combination therapy," N. Engl. J. Med. 384:630-642.
As-Sanie et al., O-1, ASRM 2022 Genes, Gametes, and Genetics, Oct. 22-26, 2022, Scientific Abstracts to be presented at the 78th Scientific Congress of the American Society for Reproductive Medicine, Oct. 22-26, 2022, Anaheim, California, p. e1.
Becker et al., Session 62, Abstracts of the 38th Hybrid Annual Meeting of the ESHRE, Jul. 3-6, 2022, p. i1 10.
Duijkers, et al., P-287, Abstracts of the 36th Annual Meeting of the ESHRE, Jul. 5 to 8, 2020, p. i268-i269.
Giudice et al., "Once daily oral relugolix combination therapy versus placebo in patients with endometriosis-associated pain: two replicate phase 3, randomised, double-blind, studies (SPIRIT 1 and 2)" Lancet (2022) 399:2267-2279, published Aug. 25, 2022.
Melis, G.B. et al. (2016). "Overview of elagolix for the treatment of endometriosis," Expert Opin. Drug Metab. Toxicol. 12:581-588.
Multi-Disciplinary Review and Evaluation of Orilissa (Elagolix Sodium) by the Center for Drug Evalation and Research; https://www.accessdata.fda.gov/drugsatfda_docs/nda/2018/210450Orig1s000MultiD.pdf; p. 262, published Jul. 3, 2018.
Myfembree U.S Prescribing Information, Jan. 2023, 41 total pages.
Myovant Sciences, "Myovant Sciences and Pfizer announce publication in The Lancet of Phase 3 Spirit 1 and Spirit 2 studies of once-daily relugolix combination therapy in women with endometriosis-associated pain", published Jun. 17, 2022.
Non-Final Office Action mailed on Apr. 11, 2023, for U.S. Appl. No. 17/317,769, filed May 11, 2021, 18 pages.
Response to Opposition filed by Myovant Sciences, Inc. on May 15, 2023, to Opposition against EP Patent No. 3518933, filed by Sandoz AG, 50 total pages.
RYEQO EPAR Product Information, Jul. 2022, 35 total pages.
Varma, K. (Jun. 2016). "Excipients used in the Formulation of Tablets," Research and Reviews: Journal of Chemistry 5(2):143-154.

* cited by examiner

COMBINATION SOLID ORAL DOSAGE FORMS OF GONADOTROPIN-RELEASING HORMONE ANTAGONISTS

CROSS-REFERENCE TO RELATED APPLICATIONS

This application is a continuation of application of International Application No. PCT/EP2021/064280, filed on May 27, 2021, which claims the benefit of U.S. Provisional Application No. 63/032,469, filed May 29, 2020, the disclosure of each of which is hereby incorporated by reference in its entirety.

FIELD

The present disclosure relates to combination solid oral dosage forms of a gonadotropin-releasing hormone (GnRH) antagonist and one or more hormone replacement medicaments. Such dosage forms may provide a nonsurgical treatment of hormone-sensitive conditions while mitigating or avoiding side effects normally associated with a GnRH antagonist, such as bone mineral density loss. In particular, the present disclosure relates to combination oral dosage forms of N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea or a corresponding amount of a pharmaceutically acceptable salt thereof, and one or more hormone replacement medicaments. In certain dosage forms, the one or more hormone replacement medicaments include estradiol, norethindrone acetate, or both.

BACKGROUND

Hormone-sensitive diseases of the female reproductive system, such as uterine fibroids, endometriosis, adenomyosis, heavy menstrual bleeding, or pain associated with uterine fibroids, endometriosis, or adenomyosis, can have a significant effect on the quality of life for many women. As these conditions are hormone-sensitive, there is an interest in methods of treatment that include regulating one or more hormones, such as estrogen or progesterone, using a GnRH agonist (GnRH receptor agonist) or GnRH antagonist (GnRH receptor antagonist). Achieving a balance of estrogen and progesterone that alleviates one or more symptoms while also avoiding serious side effects of hormone suppression is challenging. For example, bone mineral density (BMD) loss may occur if estradiol levels drop below a certain threshold. Bone mineral density loss over time can lead to serious negative effects such as increased bone fracture or osteoporosis. Suppressing progesterone without concurrent estrogen suppression can lead to endometrial hyperplasia, which is a risk factor for endometrial cancer. Conversely, estrogen- or progesterone-sensitive symptoms and disorders may be aggravated if the estrogen or progesterone levels are above an upper therapeutic limit. The balancing of these hormone interactions is further complicated by the sensitivities of the conditions themselves, as hormone-responsive gynecological conditions are not all responsive to the same levels of estrogen or progesterone.

The compound N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, also referred to herein as Compound 1, or a corresponding amount of a pharmaceutically acceptable salt thereof, is described, for example, in U.S. Pat. Nos. 7,300, 935, 8,058,280, and 10,350,170, and in U.S. Publication No. 2020-0000730. Methods of treatment using Compound 1, or a corresponding amount of a pharmaceutically acceptable salt thereof, are described, for example, in U.S. Pat. Nos. 8,735,401, and 9,346,822 and in U.S. Publication No. 2019-0262346.

SUMMARY

The present disclosure provides fixed combination (also called a fixed-dose formulations, or combination solid oral dosage forms), oral dosage forms of N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, also referred to as Compound 1, or a pharmaceutically acceptable salt thereof, and one or more hormone replacement medicaments. Administration of such a combination of agents may reduce adverse side effects normally associated with a GnRH antagonist. Examples of hormone replacement medicaments include estradiol (E2) and the progestin norethindrone acetate (NETA).

In one aspect, provided herein is a combination solid oral dosage form comprising about 18% to 22% w/w of N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof; about 0.3% to 0.7% w/w of estradiol; about 0.1% to 0.4% w/w of norethindrone acetate; about 24% to 28% w/w of mannitol; about 2% to 6% w/w of a starch selected from the group consisting of sodium starch glycolate, pregelatinized starch, and a combination of the foregoing; about 0.5% to 3% w/w of hydroxypropyl cellulose; about 0.5% to 3% w/w of magnesium stearate; about 38% to 42% w/w of lactose monohydrate; and about 1% and 5% w/w of a film coating.

In some variations, the combination solid oral dosage form comprises about 40 mg of N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof; about 1 mg of estradiol; about 0.5 mg of norethindrone acetate; about 51 mg of mannitol; about 9 mg of sodium starch glycolate; about 3 mg of hydroxypropyl cellulose; about 2 mg of magnesium stearate; about 78 mg of lactose monohydrate; and about 7 mg of a film coating.

In some variations, the combination solid oral dosage form comprises starch, wherein the starch is sodium starch glycolate. In other variations, the starch is pregelatinized starch. In other variations, the starch is a combination of sodium starch glycolate and pregelatinized starch. In some variations, the combination solid oral dosage form comprises about 9 mg of sodium starch glycolate. In some variations, the combination solid oral dosage form comprises about 2% to 3% sodium starch glycolate and about 2% to 3% pregelatinized starch.

In some variations of the combination solid oral dosage form, the amount of relugolix degradant present after storing the combination solid oral dosage form for 6 months, at 60° C. and ambient relative humidity, does not exceed 0.5% w/w. In some variations, the amount of estradiol degradant present after storing the combination solid oral dosage form for 6 months, at 60° C. and ambient relative humidity, does not exceed 1.4% w/w. In certain variations, the amount of norethindrone acetate degradant present after storing the combination solid oral dosage form for 6 months, at 60° C. and ambient relative humidity, does not exceed 1.4% w/w.

In one aspect, a process for preparing the combination solid oral dosage form comprises preparing a first granulation comprising one or more sub-batches, wherein each sub-batch comprises the N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, the mannitol, a first fraction of the starch, and the hydroxypropyl cellulose; preparing a second granulation comprising the estradiol, the norethindrone acetate, a second fraction of the starch, and the lactose monohydrate; blending the first granulation and the second granulation, and the magnesium stearate to form a final blend; and coating the final blend with the film coating.

In some variations, a process for preparing the combination oral dosage form comprises spraying an aqueous solution of the hydroxypropyl cellulose onto a fluidized mixture of the N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, the mannitol, and the first fraction of the starch to form an initial blend wherein the initial blend is dried and milled to produce a sub-batch; and wherein one or more sub-batches is blended to produce the first granulation; spraying a methanol solution of the estradiol and norethindrone acetate onto a fluidized mixture of a first fraction of the lactose monohydrate to form an initial lactose blend, wherein the initial lactose blend is dried, milled, and blended with a second fraction of the lactose monohydrate, and a second fraction of the starch to produce the second granulation; blending said first granulation with said second granulation, and the magnesium stearate, to produce the final blend, wherein the final blend is compressed; and coating the final blend with an aqueous film-coating suspension, and drying the resulting coated final blend to form the combination solid oral dosage form.

In some variations of a process for preparing the combination oral dosage form, the second granulation does not comprise mannitol. In certain variations, the first granulation comprises two sub-batches.

In some variations of the process for preparing the combination oral dosage form, the N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, the mannitol, and the first fraction of the starch, are fluidized in a fluid-bed granulator with an inlet air flow of 400-500 cfm, and at a temperature of 75-80° C.

In some variations of the process for preparing the combination oral dosage form, the aqueous solution of the hydroxypropyl cellulose is sprayed at a rate of 250-350 g/min and a target atomization pressure of 2.5-4.5 bar.

In certain variations of the process for preparing the combination oral dosage form, the initial blend is dried until a measured exhaust temperature reaches at least 37° C. and milled by a mill equipped with a 3 mm screen at an impeller speed of 930±100 rpm to produce the first granulation.

In some variations of the process for preparing the combination oral dosage form, the first fraction of the lactose monohydrate is fluidized in a fluid-bed granulator with an inlet air flow of 750-1050 cfm, and at a temperature of 37-43° C.

In some variations of the process for preparing the combination oral dosage form, the methanol solution of the estradiol and norethindrone acetate is sprayed at a rate of 550-650 g/min and a target atomization pressure of 5 bar.

In certain variations of the process for preparing the combination oral dosage form, the initial lactose blend is dried until a measured exhaust temperature reaches at least 46° C. and milled by a mill equipped with a 0.5 mm screen at an impeller speed of 2500±125 rpm.

In some variations of the process for preparing the combination oral dosage form, the initial lactose blend is further blended with the second fraction of the lactose monohydrate, and a second fraction of the starch for 180±15 revolutions.

In some variations of the process for preparing the combination oral dosage form, the first granulation and the second granulation are blended in a ratio of about 55% w/w and about 45% w/w respectively, for 70-170 revolutions. In some variations, the blend of the first and second granulations is blended with magnesium stearate to produce the final blend.

In some aspects, a combination solid oral dosage form is produced by any of the above processes.

Other objects and advantages of the present disclosure will become apparent from the detailed description that follows.

BRIEF DESCRIPTION OF THE DRAWINGS

Embodiments of the present disclosure are described more fully hereinafter with reference to the accompanying drawings, in which some, but not all, embodiments of the disclosure are shown. Like numbers refer to like elements throughout.

DETAILED DESCRIPTION

Figure 1:
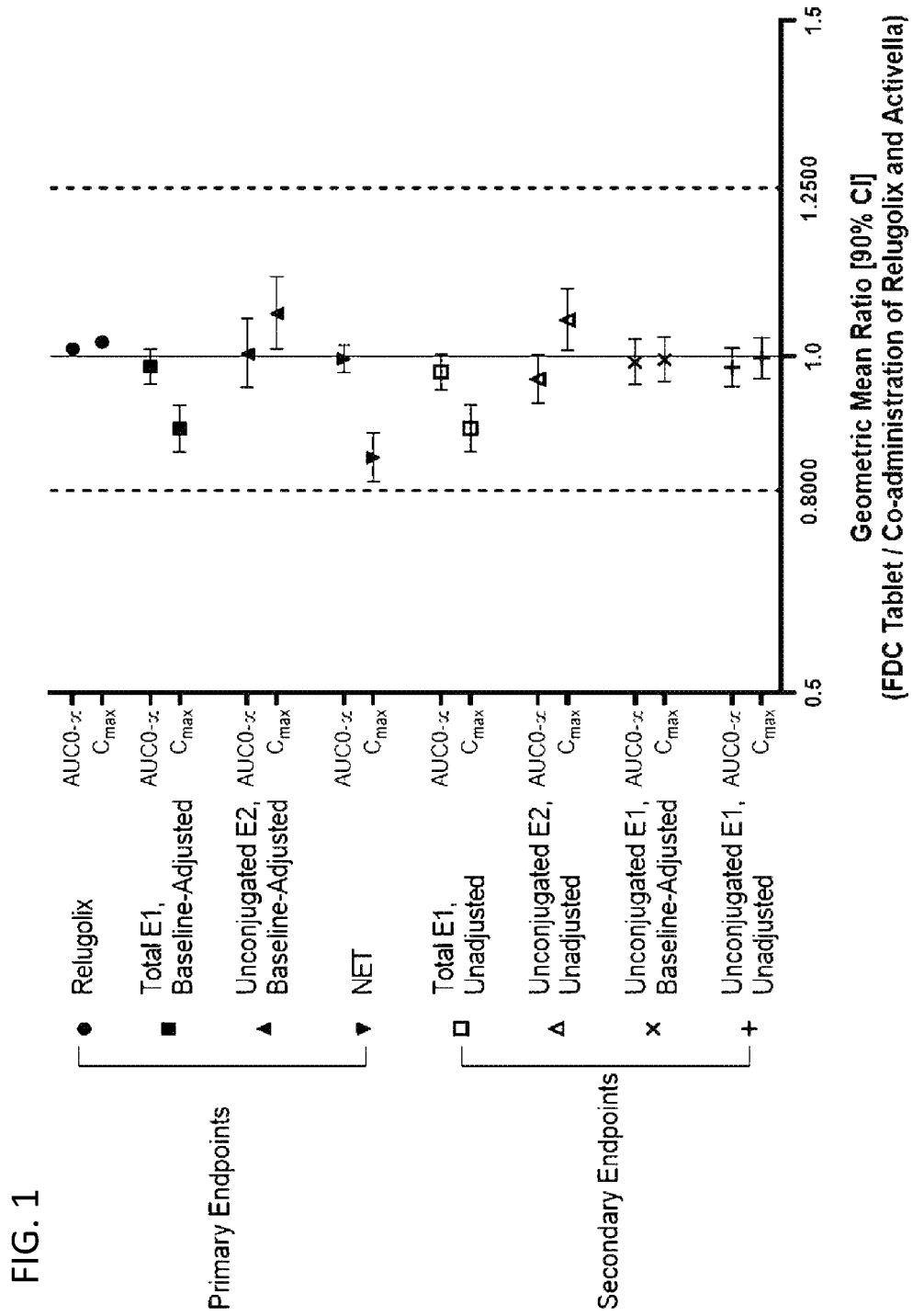
FIG. 1 shows bioequivalence, according to FDA guidelines, between a combination solid oral dosage form and a co-administration of the same combination of active ingredients.
Figure 2:
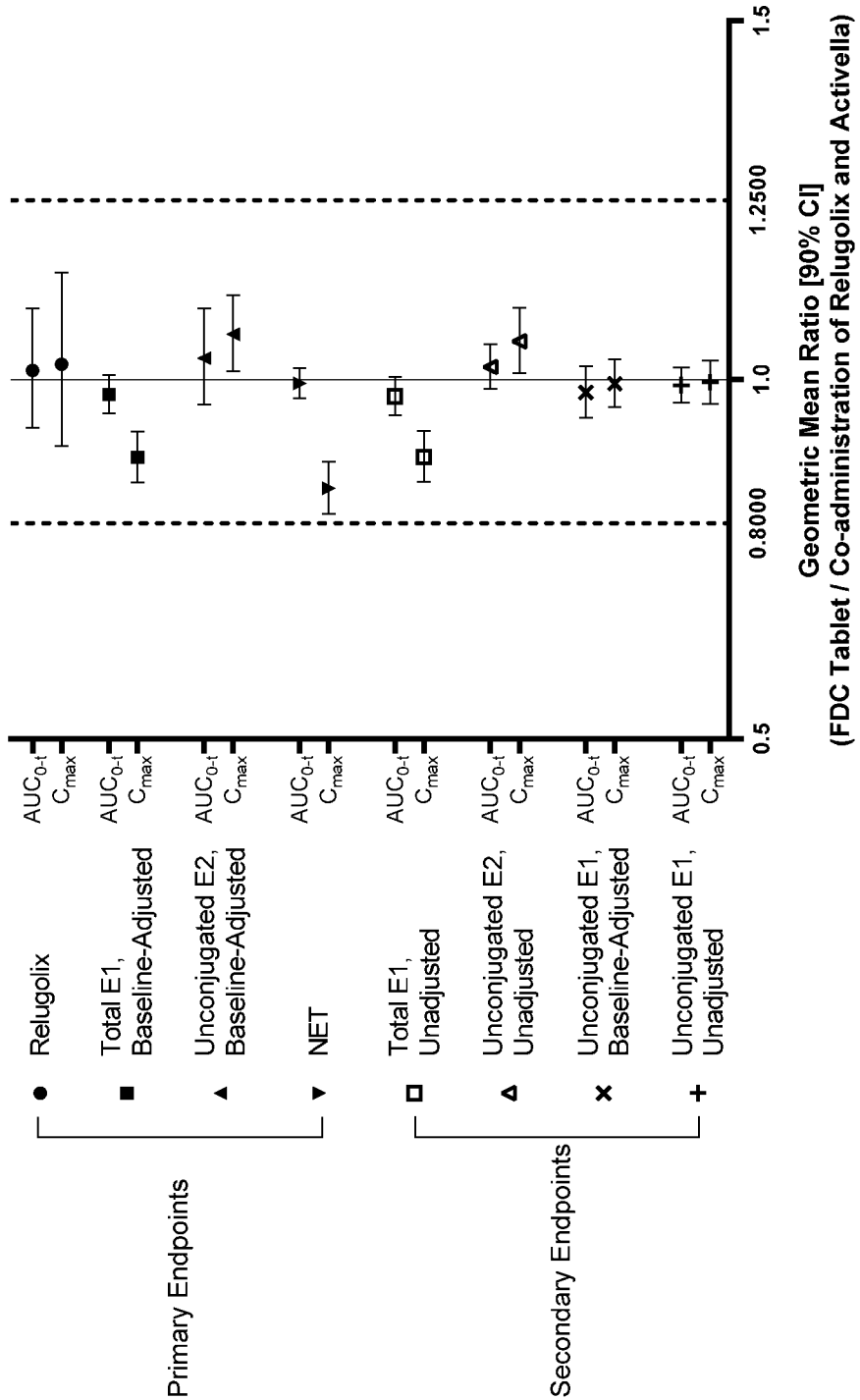
FIG. 2 shows bioequivalence, according to EMA guidelines, between a combination solid oral dosage form and a co-administration of the same combination of active ingredients.

As noted briefly above, it is important for therapy that Compound 1, or a corresponding amount of a pharmaceutically acceptable salt thereof, and hormone replacement medicaments be combined on each administration when used to treat hormone-sensitive diseases of the female reproductive system, such as uterine fibroids, endometriosis, adenomyosis, heavy menstrual bleeding, or pain associated with uterine fibroids, endometriosis, or adenomyosis. The effective treatment of the conditions described herein is challenging. Given the hormone-sensitivity of the conditions, methods of treatment include methods that seek to suppress hormone levels, particularly estrogen and progesterone levels. However, suppression of hormone levels may give rise to serious side effects, including loss of bone mineral density and vasomotor symptoms such as hot flushes and night sweats. The challenge is to find a way to treat the relevant symptoms of the conditions, while at the same time minimizing or avoiding such side effects. The treatment effectiveness of the GnRH antagonist without the adverse effects of a hypoestrogenic state requires the consistent and correct intake by the patient of both Compound 1, or a corresponding amount of a pharmaceutically acceptable salt thereof, and the hormone replacement medicaments, without inadvertently taking either alone or in an incorrect ratio. Thus, to ensure such optimal treatment, administration of a single combined formulation of Compound 1, or a corresponding amount of a pharmaceutically acceptable salt thereof, and the hormone replacement medicaments is beneficial.

The present disclosure provides combination solid oral dosage forms that achieve for each active agent (Compound 1, or a corresponding amount of a pharmaceutically acceptable salt thereof, and hormone replacement medicaments) bioequivalence with separately administered formulations of Compound 1, or a corresponding amount of a pharmaceutically acceptable salt thereof, and the other active agents. For instance, the combination solid oral dosage forms containing Compound 1, or a corresponding amount of a pharmaceutically acceptable salt thereof, estradiol, and norethindrone acetate achieves bioequivalence with the administration of separate formulations of Compound 1, or a corresponding amount of a pharmaceutically acceptable salt thereof, estradiol/norethindrone acetate. Administration of a combination solid oral dosage form, instead of separate dosage forms, typically improves patient dosing regimen compliance and therefore outcomes with respect to both efficacy and safety (e.g., minimizing bone mineral density loss and other side effects over time).

Additionally, the combination solid oral dosage forms described herein maintain the stability of each active ingredient over time, thereby providing adequate shelf life. As will be appreciated by the skilled artisan, active ingredient stability over time in pharmaceutical formulations is important to ensure that patients receive the correct dose of each active ingredient and to minimize the amount of degradants. As will also be appreciated by the skilled artisan, when combining active agents, it cannot be predicted whether there will be an interaction between active agents when formulated together, nor whether excipients acceptable for use with one active may adversely impact the stability or bioavailability of another active ingredient.

As used herein, Compound 1 is N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea. Compound 1 is also known as relugolix. Compound 1 is represented by the structure shown below.

Compound 1

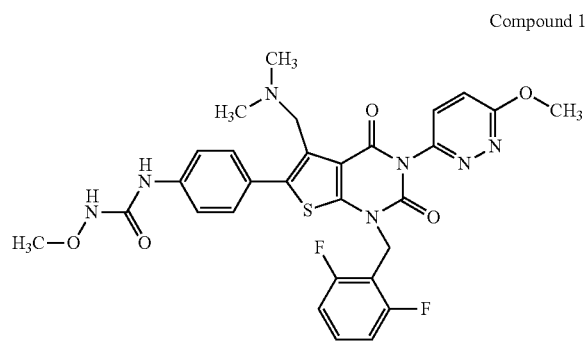

Compound 1, or a corresponding amount of a pharmaceutically acceptable salt thereof, and pharmaceutical compositions including Compound 1 can be produced by methods described in U.S. Pat. Nos. 7,300,935, 8,058,280 9,346,822, 9,758,528, 10,150,778, 10,544,160, 10,464,945 and 8,735,401 and U.S. Publication No. 2020-0000730.

Throughout the present disclosure, amounts of Compound 1 disclosed refer to the amount of Compound 1 free form present in the formulation. The term "corresponding amount" as used herein refers to the amount of a pharmaceutically acceptable salt of Compound 1 required to obtain the amount of Compound 1 free form recited in the formulation or method. It would be clear to one of skill in the art how to calculate the "corresponding amount" of the salt of a compound, such as the corresponding amount of the pharmaceutically acceptable salt of Compound 1, taking into account the difference in molecular weight between the free form of a compound and a salt form. For example, about 40 mg of Compound 1 would correspond to about 42.3 mg of the hydrochloride salt of Compound 1.

Salts of Compound 1 may be pharmaceutically acceptable acid addition salts. Such salts include, for example, salts with inorganic acids (e.g., hydrochloric acid, hydrobromic acid, nitric acid, sulfuric acid, phosphoric acid, and the like), and salts with organic acids (e.g., formic acid, acetic acid, trifluoroacetic acid, fumaric acid, oxalic acid, tartaric acid, maleic acid, citric acid, succinic acid, malic acid, methanesulfonic acid, benzenesulfonic acid, p-toluenesulfonic acid, hippuric acid, and the like).

Combining Compound 1, or a corresponding amount of a pharmaceutically acceptable salt thereof, and hormone replacement medicaments provides several challenges that, if not successfully overcome, will mitigate the viability and effectiveness of the dosage form. For example, formulations requirements include achieving pharmacokinetics of both Compound 1, or a corresponding amount of a pharmaceutically acceptable salt thereof, and the hormone replacement medicaments such that the formulation is bioequivalent to when Compound 1, or a corresponding amount of a pharmaceutically acceptable salt thereof, and the hormone replacement medicaments are administered separately, as well as achieving the stability of each of the active ingredients over time.

There are several ways to achieve the combination solid oral dosage form of the present disclosure, and which are the subject of the present disclosure. These dosage forms and methods of making same are discussed below.

Combination Solid Oral Dosage Forms

To ensure content uniformity of the tablet, careful selection of the combination of excipients and formulation type is required. Compound 1 is sensitive to temperature, and/or moisture so if not properly formulated can degrade. Thus, it is necessary that Compound 1, or a corresponding amount of a pharmaceutically acceptable salt thereof, and the hormone replacement medicaments be combined in the structure of the oral dosage form to maintain stability and content uniformity therein, yet achieve desirable PK parameters discussed herein and adequate stability to ensure shelf life. In one aspect is provided a combination solid oral dosage form comprising about 18% to 22% w/w of compound 1, or a corresponding amount of a pharmaceutically acceptable salt thereof. In some embodiments, the combination solid oral dosage form comprises about 0.3% to 0.7% w/w of estradiol. In some embodiments, the combination solid oral dosage form comprises about 0.1% to 0.4% w/w of norethindrone acetate. In some embodiments, the combination solid oral dosage form comprises about 24% to 28% w/w of mannitol. In some embodiments, the combination solid oral dosage form comprises about 2% to 6% w/w of a starch. In some embodiments, the combination solid oral dosage form comprises about 0.5% to 3% w/w of hydroxypropyl cellulose. In some embodiments, the combination solid oral dosage form comprises about 0.5% to 3% w/w of magnesium stearate. In some embodiments, the combination solid oral dosage form comprises about 38% to 42% w/w of lactose monohydrate. In some embodiments, the combination solid oral dosage form comprises about 1% to 5% w/w of a film coating.

An excipient refers to a component of a solid oral dosage form that is not compound 1, or a corresponding amount of a pharmaceutically acceptable salt thereof, estradiol, or northindrone acetate. The combination solid oral dosage forms may be tablets and the tablets may be coated with a film coating.

The mass of individual excipients will vary depending on several factors including the amounts of Compound 1, or a corresponding amount of a pharmaceutically acceptable salt thereof, and the hormone replacement medicaments, and the number and amounts of other excipients. In some embodiments, excipients will be in an amount from about 70 wt % to 80 wt %. Excipients in the dosage forms described herein include mannitol; a starch selected from sodium starch glycolate and pregelatinized starch; hydroxypropyl cellulose; magnesium stearate; and lactose monohydrate A weight fraction or weight percent refers to the ratio of a substance within a mixture to the total mass of the mixture. Weight fractions or weight percents may be represented, for example, by w/w, % w/w, or wt %.

In some embodiments, an excipient used in the composition is mannitol. In some embodiments, mannitol is added to a first granulation containing Compound 1, or a corresponding amount of a pharmaceutically acceptable salt thereof. In some embodiments, mannitol is present with other excipients.

In some embodiments, an excipient used in the composition is lactose. Lactose, as used herein, includes anhydrous lactose as well as lactose hydrates, such as lactose monohydrate. In some embodiments, lactose is added to a second granulation containing estradiol and norethindrone acetate. In some embodiments, lactose is present with other excipients. In some dosage forms of the present disclosure, dosage forms containing lactose as the majority excipient are more stable to heat and/or moisture than those containing mannitol, or than those containing a mixture of lactose and mannitol wherein mannitol is the majority excipient.

In some embodiments, the combination solid oral dosage form comprises about 18% to 22% w/w of compound 1, or a corresponding amount of a pharmaceutically acceptable salt thereof, about 0.3% to 0.7% w/w of estradiol, about 0.1% to 0.4% w/w of norethindrone acetate, about 24% to 28% w/w of mannitol, about 2% to 6% w/w of a starch, about 0.5% to 3% w/w of hydroxypropyl cellulose, about 0.5% to 3% w/w of magnesium stearate, about 38% to 42% w/w of lactose monohydrate, and about 1% to 5% w/w of a film coating.

In some embodiments, the combination solid oral dosage form comprises about 40 mg of compound 1, or a corresponding amount of a pharmaceutically acceptable salt thereof. In some embodiments, the combination solid oral dosage form comprises about 1 mg of estradiol. In some embodiments, the combination solid oral dosage form comprises about 0.5 mg of norethindrone acetate. In some embodiments, the combination solid oral dosage form comprises about 51 mg of mannitol. In some embodiments, the combination solid oral dosage form comprises about 9 mg of sodium starch glycolate. In some embodiments, the combination solid oral dosage form comprises about 3 mg of hydroxypropyl cellulose. In some embodiments, the combination solid oral dosage form comprises about 2 mg of magnesium stearate. In some embodiments, the combination solid oral dosage form comprises about 78 mg of lactose monohydrate. In some embodiments, the combination solid oral dosage form comprises about 7 mg of a film coating.

In some embodiments, the combination solid oral dosage form comprises about 40 mg of compound 1, or a corresponding amount of a pharmaceutically acceptable salt thereof, about 1 mg of estradiol, about 0.5 mg of norethindrone acetate, about 51 mg of mannitol, about 9 mg of sodium starch glycolate, about 3 mg of hydroxypropyl cellulose, about 2 mg of magnesium stearate, about 78 mg of lactose monohydrate, and about 7 mg of a film coating.

In some embodiments, the combination solid oral dosage form comprises starch. In some embodiments, starch is sodium starch glycolate. In some embodiments, starch is pregelatinized starch. In some embodiments, starch is a combination of sodium starch glycolate and pregelatinized starch.

In some embodiments, the solid oral dosage form comprises about 9 mg of sodium starch glycolate. In some embodiments, the solid oral dosage form comprises a combination of sodium starch glycolate and pregelatinized starch. In some embodiments, the combination solid oral dosage form comprises about 2% to 3% sodium starch glycolate and about 2% to 3% pregelatinized starch. In some embodiments, the combination solid oral dosage form comprises about 3-6 mg sodium starch glycolate and about 3-6 mg pregelatinized starch.

A film coating may be used to help reduce physical degradation during packaging and storing, increase swallowability, mitigate any adverse tastes associated with the dosage form ingredients and add color to the tablet. Film coating ingredients include, but are not limited to, one or more film formers, colorants, pigments or antioxidants, taste masking agents or flavoring agents.

An example of a film former is hydroxypropyl methylcellulose (HPLC). In some embodiments, an HPMC is hypromellose 2910. In some embodiments, the film coating is present in an amount less than 5 wt % of the final combination solid oral dosage form. In some embodiments, the film coating is present in an amount between 1 wt % and 5 wt % of the final combination solid oral dosage form. In some embodiments, the film coating is present in an amount less than 10 mg of the final combination solid oral dosage form. In some embodiments, the film coating is present in an amount between 1-10 mg of the final combination solid oral dosage form. In some embodiments, the film coat is a commercial film coating system such as Opadry II® Yellow.

In some embodiments, the combination solid oral dosage form comprises a degradant. In some embodiments, the degradant is a compound 1 (relugolix) degradant. In some embodiments, the degradant is an estradiol degradant. In some embodiments, the degradant is an norethindrone acetate degradant.

In some embodiments, the combination solid oral dosage form comprises a compound 1 degradant. In some embodiments, the combination solid oral dosage form is a combination solid oral dosage form wherein the amount of compound 1 degradant present after storing said combination solid oral dosage form for 6 months, at 60° C. and ambient relative humidity, does not exceed 0.5% w/w. In some embodiments, the combination solid oral dosage form is a combination solid oral dosage form wherein the amount of compound 1 degradant present after storing said combination solid oral dosage form for 6 months, at 60° C. and ambient relative humidity, does not exceed 0.4% w/w.

In some embodiments, the combination solid oral dosage form comprises an estradiol degradant. In some embodiments, the combination solid oral dosage form is a combination solid oral dosage form wherein the amount of estradiol degradant present after storing said combination solid oral dosage form for 6 months, at 60° C. and ambient relative humidity, does not exceed 1.4% w/w. In some embodiments, the combination solid oral dosage form is a combination solid oral dosage form wherein the amount of estradiol degradant present after storing said combination solid oral dosage form for 6 months, at 60° C. and ambient relative humidity, does not exceed 1.3% w/w.

In some embodiments, the combination solid oral dosage form comprises a norethindrone acetate degradant. In some embodiments, the combination solid oral dosage form is a combination solid oral dosage form wherein the amount of norethindrone acetate degradant present after storing said combination solid oral dosage form for 6 months, at 60° C. and ambient relative humidity, does not exceed 1.4% w/w. In some embodiments, the combination solid oral dosage form is a combination solid oral dosage form wherein the amount of norethindrone acetate degradant present after storing said combination solid oral dosage form for 6 months, at 60° C. and ambient relative humidity, does not exceed 1.2% w/w. In some embodiments, the combination solid oral dosage form is a combination solid oral dosage form wherein the amount of norethindrone acetate degradant present after storing said combination solid oral dosage form for 6 months, at 60° C. and ambient relative humidity, does not exceed 1.0% w/w. In some embodiments, the combination solid oral dosage form is a combination solid oral dosage form wherein the amount of norethindrone acetate degradant present after storing said combination solid oral dosage form for 6 months, at 60° C. and ambient relative humidity, does not exceed 0.7% w/w.

As mentioned above, in some dosage forms of the present disclosure, dosage forms containing lactose as the majority excipient are more stable to heat and/or moisture than similar formulations containing a majority of mannitol, or than those containing a mixture of lactose and mannitol wherein mannitol is the majority excipient. For instance, in comparing similar lactose and mannitol formulations of the present disclosure, those formulations containing majority lactose are more stable at 60° C. and ambient relative humidity than those containing majority mannitol. The methods for testing stability of drug formulations under these conditions are well known in the art and are described in the Examples of this disclosure.

It should be understood that the combination solid oral dosage forms of the present disclosure can include, for all embodiments discussed above, various other organic or inorganic excipients. Also, other pharmaceutical additives can be included in the combination solid oral dosage forms of the present disclosure. Such additives include, but are not limited to, one or more preservatives, sweetening agents, and effervescent excipients.

Certain embodiments of the present disclosure provide a compressed, film-coated tablet comprising compound 1, or a corresponding amount of a pharmaceutically acceptable salt thereof, estradiol and NETA, and excipients. The film-coated tablet can comprise from about 5% to 80% of compound 1, or a corresponding amount of a pharmaceutically acceptable salt thereof. In some embodiments, the compressed tablet can comprise about 20% to 50%, of compound 1, or a corresponding amount of a pharmaceutically acceptable salt thereof based on the total weight of the film-coated tablet. In some embodiments, the compressed tablet can comprise about 0.3-0.7% of estradiol, and 0.1%-0.4% NETA or a salt thereof, based on the total weight of the film-coated tablet.

Examples of excipients include mannitol, sodium starch glycolate, pregelatinized starch, hydroxypropyl cellulose, magnesium stearate, lactose monohydrate.

The compressed tablets of the present disclosure be film coated. Film coating concentration can be varied up to about 10% to complement the drug amount. In some embodiments, the film coting is about 1% to 5%.

A sweetening agent can obscure, minimize or neutralize of bitter or metallic taste. Sweetening agents include, but are not limited to, natural sweeteners, such as sucrose and sorbitol, and artificial sweeteners include saccharin, aspartame, sucralose and acesulfam-K.

In some embodiments are provided combination solid oral dosage forms produced by the processes described herein.

Pharmacokinetics

In some embodiments, Compound 1, or a corresponding amount of a pharmaceutically acceptable salt thereof, is formulated to achieve effective plasma levels for treatment with Compound 1, or a corresponding amount of a pharmaceutically acceptable salt thereof. In some embodiments, a 40 mg formulation administered preprandially as a single combination solid oral dosage form of Compound 1, or a corresponding amount of a pharmaceutically acceptable salt thereof, and hormone replacement medicaments provides a blood plasma concentration of at least about 7.56 ng·h/ml at 1 hour after dose administration. In some embodiments, it provides a blood plasma concentration of about 16.2 ng·h/ml at 1 hour after dose administration. In some embodiments, it provides a blood plasma concentration of about 28 ng·h/ml at 1 hour after dose administration. In some embodiments, formulations described herein achieve the same average drug exposure in subjects as Compound 1, or a corresponding amount of a pharmaceutically acceptable salt thereof, and the hormone replacement medicaments when separately co-administered.

In some embodiments, Compound 1, or a corresponding amount of a pharmaceutically acceptable salt thereof, is formulated to achieve a low variability of pharmacokinetic and pharmacodynamic effects in subjects. In some embodiments, a combination solid oral dosage form of Compound 1, or a corresponding amount of a pharmaceutically acceptable salt thereof, taken orally preprandially provides pharmacokinetic and pharmacodynamic effects that are less subject to variation in subjects, yet achieves the same average drug exposure in the subjects as the other embodiments described herein.

In some embodiments, administration of a combination solid oral dosage form is food independent, and provides the desired pharmacokinetic and pharmacodynamic effects that are less subject to variation in subjects than separate combinations.

The BioPharmaceutical Classification System (BCS) classifies drug substances as to their solubility and permeability. For example, a drug substance is considered highly soluble when the highest dose strength is soluble in ≤250 ml water over a pH range of 1-7, and highly permeable when the extent of absorption in humans is determined to be >90% of an administered dose, in comparison to an intravenous reference dose. A BCS 1 compound is highly soluble and highly permeable, while a BCS 4 compound is poorly soluble and has poor permeability. For BCS 4 compounds, bioavailability and the pharmacokinetic (PK) profile or parameters, such as mean maximum plasma concentration ($C_{max}$), mean time to maximum plasma concentration ($T_{max}$) and mean area under the plasma concentration vs. time curve (AUC) after oral administration, can be positively or negatively impacted by the formulation, the type of the excipients selected and the specific excipients. The safety and efficacy of the fixed combination oral product depends on these PK parameters being in the appropriate range. Compound 1 is a BCS 4 compound and therefore for fixed combination oral products having compound 1, or a corresponding amount of a pharmaceutically acceptable salt thereof, the type and specifics of the excipients must be carefully selected so as to achieve the target pharmacokinetic parameters.

Accordingly, a combination solid oral dosage form having 40 mg of compound 1, or a corresponding amount of a pharmaceutically acceptable salt thereof, or a corresponding amount of a pharmaceutically acceptable salt thereof, and hormone replacement medicaments should be formulated to achieve a rate of solubilization in the gastrointestinal tract and a permeability that will not adversely impact the desired PK profile of the dosage form. Thus, as disclosed herein, the combination solid oral dosage forms of the present disclosure may be designed to have a select combination of excipients, formulation and dosage form structure to derive that desired PK profile.

For example, when the combination solid oral dosage forms of the present disclosure, have Compound 1, or a corresponding amount of a pharmaceutically acceptable salt thereof, in an amount of 40 mg and hormone replacement medicaments, and is administered orally in a fasted state, e.g., at least 2 hours after a meal and no less than 30 minutes before the next meal, the mean maximum plasma concentration, or $C_{max}$, for Compound 1, or a corresponding amount of a pharmaceutically acceptable salt thereof, is in the range of 5 ng/mL to 35 ng/mL. In some embodiments, the mean $C_{max}$ is in the range from 10 ng/mL to 30 ng/mL. In some embodiments, the mean $C_{max}$ is in the range from 15 ng/mL to 25 ng/mL.

Further, when the combination solid oral dosage forms of the present disclosure, have Compound 1, or a corresponding amount of a pharmaceutically acceptable salt thereof, in an amount of 40 mg and hormone replacement medicaments and administered orally in a fasted state, e.g., at least 2 hours after a meal and no less than 30 minutes before the next meal, the mean concentration under the plasma vs. time curve from 0 to 24 hours for Compound 1, or $AUC_{0-24}$, is in the range of from 50 to 200 ng·h/mL, or in the range of from 75 to 150 ng·h/mL.

It is advantageous that a patient may take the combination solid oral dosage form before or after a meal, which means that consuming a meal has a minimum effect on the mean plasma AUC relative to the fasting state. In some embodiments a 40 mg "food independent formulation" dosage form of compound 1, or a corresponding amount of a pharmaceutically acceptable salt thereof, is taken orally, the ratio of the mean plasma AUC for fed-state administration relative to fasted-state administration [mean plasma AUC(fed)/mean plasma AUC(fasted)] is 0.9 to 1.1, 0.95 to 1.05, or 1. In some embodiments, the mean plasma $AUC_{(fed)}$/mean plasma $AUC_{(fasted)}$ is 0.8 to 1.25.

In some embodiments, the PK profile of Compound 1, or a corresponding amount of a pharmaceutically acceptable salt thereof, is not affected by food intake. In other embodiments, differences in mean $C_{max}$ and mean plasma AUC values for fed and fasted administration of Compound 1, or a corresponding amount of a pharmaceutically acceptable salt thereof, in an amount of 40 mg and hormone replacement medicaments in an immediate release formulation are shown to be clinically significant based on dose-response (exposure-response) and/or pharmacokinetic-pharmacodynamic relationships of Compound 1, or a corresponding amount of a pharmaceutically acceptable salt thereof, in human studies.

The combination solid oral dosage form having 40 mg of Compound 1, or a corresponding amount of a pharmaceutically acceptable salt thereof, and hormone replacement medicaments containing a certain amount of estradiol and NETA is specifically formulated to be bioequivalent to the co-administration of a first oral dose of 40 mg of Compound 1, or a corresponding amount of a pharmaceutically acceptable salt thereof, having the formulation described in Example 2 and a second, separate hormone replacement oral dosage form containing the same certain amount of estradiol and NETA, when the dosage forms are administered in the fasted state.

The combination solid oral dosage form having 40 mg of Compound 1, or a corresponding amount of a pharmaceutically acceptable salt thereof, when administered in the fed state shows a 60% reduction in mean $C_{max}$ and a 45% reduction in mean plasma $AUC_{0-inf}$ when compared to the same dosage administered in the fasted state. Further, the combination solid oral dosage form having 40 mg of Compound 1, or a corresponding amount of a pharmaceutically acceptable salt thereof, and hormone replacement medicaments containing NETA is specifically formulated to be bioequivalent to co-administration of a first oral dose of 40 mg of Compound 1, or a corresponding amount of a pharmaceutically acceptable salt thereof, having the formulation described in Example 2 and a second, separate hormone replacement oral dosage form containing NETA, when the dosage forms are administered in the fed state.

As noted above, it may be advantageous to have a combination solid oral dosage form of Compound 1, or a corresponding amount of a pharmaceutically acceptable salt thereof, that can be administered regardless of food intake. An absence of food effect on bioavailability is established if the 90 percent confidence interval for the ratio of population geometric means between fed and fasted treatments, based on log-transformed data, is contained in the equivalence limits of 80 to 125 percent for both $AUC_{0-inf}$ ($AUC_{0-t}$ when appropriate) and mean $C_{max}$, or when the clinical significance of the food effect is shown to be not significant.

Thus, in some embodiments, a solid, oral dosage form of Compound 1, or a corresponding amount of a pharmaceutically acceptable salt thereof, is provided that has a 90 percent confidence interval for the ratio of population geometric means between fed and fasted treatments, based on log-transformed data, that is contained in the equivalence limits of 70 to 135 percent for Compound 1, or a corresponding amount of a pharmaceutically acceptable salt thereof, $AUC_{0-inf}$ or $AUC_{0-t}$, or 80 to 125 percent.

In some embodiments, a solid, oral immediate release dosage form of Compound 1, or a corresponding amount of a pharmaceutically acceptable salt thereof, is provided that has a 90 percent confidence interval for the ratio of population geometric means between fed and fasted treatments, based on log-transformed data, that is contained in the equivalence limits of 70 to 135 percent for Compound 1, or a corresponding amount of a pharmaceutically acceptable salt thereof, mean $C_{max}$, and or 80 to 125 percent.

In some embodiments, a combination solid oral dosage form embodiment, having Compound 1, or a corresponding amount of a pharmaceutically acceptable salt thereof, in an amount of 40 mg and hormone replacement medicaments containing estradiol and NETA in an immediate release formulation has a 90 percent confidence interval for the ratio of population geometric means between fed and fasted treatments, based on log-transformed data, that is contained in the equivalence limits of 70 to 135 percent for Compound 1, or a corresponding amount of a pharmaceutically acceptable salt thereof, $AUC_{0-inf}$ or $AUC_{0-t}$, or 80 to 125 percent.

In some embodiments, a combination solid oral dosage form embodiment, having Compound 1, or a corresponding amount of a pharmaceutically acceptable salt thereof, in an amount of 40 mg and hormone replacement medicaments containing estradiol whether alone or in combination with NETA in an immediate release formulation has a 90 percent confidence interval for the ratio of population geometric means between fed and fasted treatments, based on log-transformed data, that is contained in the equivalence limits of 70 to 135 percent for Compound 1, or a corresponding amount of a pharmaceutically acceptable salt thereof, mean $C_{max}$, or 80 to 125 percent.

In some embodiments, differences in mean $C_{max}$ and mean AUC for fed and fasted administration of a combination solid oral dosage form embodiment, having Compound 1, or a corresponding amount of a pharmaceutically acceptable salt thereof, in an amount of 40 mg and hormone replacement medicaments containing NETA in an immediate release formulation, are shown to not be clinically significant based on dose-response (exposure-response) and/or pharmacokinetic-pharmacodynamic relationships of Compound 1, or a corresponding amount of a pharmaceutically acceptable salt thereof, in human studies.

The combination solid oral dosage forms of the present disclosure, having Compound 1, or a corresponding amount of a pharmaceutically acceptable salt thereof, in an amount of 40 mg and hormone replacement medicaments in an immediate release formulation and administered orally in a fasted state, i.e., at least 2 hours after a meal and no less than 30 minutes before the next meal has a mean plasma $T_{1/2}$ for Compound 1, or a corresponding amount of a pharmaceutically acceptable salt thereof, between about 37 and about 42 hours.

Processes for Preparing the Combination Solid Oral Dosage Forms

In another aspect is provided a process for preparing the combination solid oral dosage forms comprises:
  a) preparing a first granulation comprising the N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, the mannitol, a first fraction of the starch, the hydroxypropyl cellulose, and, optionally, a first fraction of the magnesium stearate;
  b) preparing a second granulation comprising the estradiol, the norethindrone acetate, a second fraction of the starch, the lactose monohydrate and, optionally, magnesium stearate, wherein when the first fraction of the magnesium stearate is added in step (a), a second fraction of magnesium stearate is added in step (b); and
  c) blending the first granulation and the second granulation, and optionally, magnesium stearate, when magnesium stearate is added in neither step (a) nor (b), to form a final blend; and
  d) coating the final blend with the film coating.

In some embodiments, the process for preparing the combination solid oral dosage form comprises:
  a) spraying an aqueous solution of the hydroxypropyl cellulose onto a fluidized mixture of the N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, the mannitol, the first fraction of the starch, and, optionally, the first fraction of the magnesium stearate, to form an initial blend wherein the initial blend is dried and milled to produce the first granulation;
  b) spraying a methanol solution of the estradiol and norethindrone acetate onto a fluidized mixture of a first fraction of the lactose monohydrate to form an initial lactose blend, wherein the initial lactose blend is dried, milled, and blended with a second fraction of the lactose monohydrate, a second fraction of the starch, and, optionally, magnesium stearate, wherein when the first fraction of the magnesium stearate is added in step (a), the second fraction of magnesium stearate is added in step (b) to produce the second granulation;
  c) blending said first granulation with said second granulation, and optionally, magnesium stearate, when magnesium stearate is added in neither step (a) nor (b), to produce the final blend, wherein the final blend is compressed; and
  d) coating the final blend with an aqueous film-coating suspension, and drying the resulting coated final blend to form the combination solid oral dosage form.

In some embodiments, a process for preparing the combination solid oral dosage form comprises:
  a) preparing a first granulation comprising one or more sub-batches, wherein each sub-batch comprises the N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, the mannitol, a first fraction of the starch, and the hydroxypropyl cellulose;
  b) preparing a second granulation comprising the estradiol, the norethindrone acetate, a second fraction of the starch, and the lactose monohydrate; and
  c) blending the first granulation and the second granulation, and the magnesium stearate to form a final blend; and
  d) coating the final blend with the film coating.

In some embodiments, a process for preparing the combination solid oral dosage form comprises:
  a) spraying an aqueous solution of the hydroxypropyl cellulose onto a fluidized mixture of the N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, the mannitol, and the first fraction of the starch to form an initial blend wherein the initial blend is dried and milled to produce a sub-batch; and wherein one or more sub-batches is blended to produce the first granulation;
  b) spraying a methanol solution of the estradiol and norethindrone acetate onto a fluidized mixture of a first fraction of the lactose monohydrate to form an initial lactose blend, wherein the initial lactose blend is dried, milled, and blended with a second fraction of the lactose monohydrate, and a second fraction of the starch to produce the second granulation;
  c) blending said first granulation with said second granulation, and the magnesium stearate, to produce the final blend, wherein the final blend is compressed; and d) coating the final blend with an aqueous film-coating suspension, and drying the resulting coated final blend to form the combination solid oral dosage form.

In some embodiments the first granulation and the second granulation are blended with magnesium stearate to form a final blend. In some embodiments, the final blend is coated with the film coating, for example, after the final blend is compressed and dried.

In some embodiments, a first granulation comprises one or more sub-batches, wherein each sub-batch comprises compound 1, or a corresponding amount of a pharmaceutically acceptable salt thereof, mannitol, a first fraction of starch, and hydroxypropyl cellulose. In some of the above embodiments, a second granulation comprises estradiol, norethindrone acetate, a second fraction of starch, and lactose.

In some embodiments, a first granulation is produced by spraying an aqueous solution of hydroxypropyl cellulose onto a fluidized mixture of compound 1, or a corresponding amount of a pharmaceutically acceptable salt thereof, mannitol, and a first fraction of starch to form an initial blend, wherein the initial blend is dried and milled to produce a sub-batch. In some embodiments, one or more sub-batches is blended to produce a first granulation. In some embodiments, a first granulation comprises only one sub-batch. In some embodiments, a first granulation comprises two sub-batches.

In some embodiments, a second granulation is produced by spraying a methanol solution of estradiol and norethindrone acetate onto a fluidized mixture of a first fraction of lactose monohydrate to form an initial lactose blend, wherein the initial lactose blend is dried, milled, and blended with a second fraction of lactose monohydrate and a second fraction of starch.

In some embodiments, blending a first granulation and a second granulation with magnesium stearate produces a final blend. In some embodiments, a final blend is compressed. In some embodiments, a final blend is coated with an aqueous film-coating suspension, such as known to the skilled artisan and described herein. In some embodiments, a coated final blend is dried to form a combination solid oral dosage form.

In some embodiments, the second granulation does not comprise mannitol.

In some embodiments, the N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, the mannitol, and the first fraction of the starch are fluidized. In some of the above embodiments, the N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, the mannitol, and the first fraction of the starch are fluidized in a fluid-bed granulator. In some of the above embodiments, the N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, the mannitol, and the first fraction of the starch are fluidized in a fluid-bed granulator with an inlet air flow of 400-500 cfm, and at a temperature of 75-80° C.

In some embodiments, the aqueous solution of the hydroxypropyl cellulose is sprayed. In some of the above embodiments, the aqueous solution of the hydroxypropyl cellulose is sprayed at a rate of 250-350 g/min and a target atomization pressure of 2.5-4.5 bar.

In some embodiments, the initial blend is dried and milled to produce the first granulation. In some of the above embodiments, the initial blend is dried until a measured exhaust temperature reaches at least 37° C. and milled by a mill equipped with a 3 mm screen at an impeller speed of 930±100 rpm to produce the first granulation.

In some embodiments, the first fraction of the lactose monohydrate is fluidized. In some of the above embodiments, the first fraction of the lactose monohydrate is fluidized in a fluid-bed granulator. In some of the above embodiments, the first fraction of the lactose monohydrate is fluidized in a fluid-bed granulator with an inlet air flow of 750-1050 cfm, and at a temperature of 37-43° C.

In some embodiments, the methanol solution of the estradiol and norethindrone acetate is sprayed. In some of the above embodiments, the methanol solution of the estradiol and norethindrone acetate is sprayed at a rate of 550-650 g/min and a target atomization pressure of 5 bar.

In some embodiments, the initial lactose blend is dried and milled. In some of the above embodiments, the initial lactose blend is dried until a measured exhaust temperature reaches at least 46° C. and milled by a mill equipped with a 0.5 mm screen at an impeller speed of 2500±125 rpm.

In some embodiments, the initial lactose blend is further blended with the second fraction of the lactose monohydrate, and a second fraction of the starch. In some of the above embodiments, the initial lactose blend is further blended with the second fraction of the lactose monohydrate, and a second fraction of the starch for 180±15 revolutions.

In some embodiments, the first granulation and the second granulation are blended. In some of the above embodiments, the first granulation and the second granulation are blended in a ratio of about 55% w/w and about 45% w/w respectively, for 70-170 revolutions.

Granulation can be wet granulation. Wet granulations can be conducted, for example, using granulator mixers, such as a Fielder 10 L high shear granulator mixer, a low shear, a drum or pan granulator, and a fluid bed granulator. Granulation can also be achieved by conducting dry granulation (Without fluid) using a roller compaction process. One technique to conduct the granulation and drying step in accordance with the present disclosure is to utilize fluid bed granulator/dryer such as Glatt GPCG 2. The sizing (e.g., milling) step can be conducted, for example, using mills such as a Comil or a Fitz mill. The blending steps can be conducted in a V-blender or a bin blender. The compression step to form the tablet can be done, for example, using a variety of presses including a beta press, single station F-press or a 6-station Korsh. Film coating can be performed, for example, in a Glatt Column coater or a smaller Hi-coater (9" 12" pan).

For all of the above embodiments, Compound 1, or a corresponding amount of a pharmaceutically acceptable salt thereof, during its synthesis, can be controlled purposely during the crystallization step to produce smaller Compound 1 particles. Such particles may enhance solubility and the dissolution rate of Compound 1, or a corresponding amount of a pharmaceutically acceptable salt thereof in the combination solid oral dosage form. Along these same lines, Compound 1, or a corresponding amount of a pharmaceutically acceptable salt thereof can be nanomilled or micronized to increase surface area as well. Thus, any one of these three processes can be used alone or in conjunction with any one of the embodiments discussed above to achieve the desired PK profile. Crystalline forms of compound 1, or a corresponding amount of a pharmaceutically acceptable salt thereof are described in U.S. Application No. 62/913,560, U.S. Application No. 62/913,606, and U.S. Pat. No. 10,464,945, incorporated herein by reference in their entireties.

Methods of Use

The present disclosure provides a method of treating a disorder comprising administering an effective amount of a combination solid oral dosage form, or pharmaceutical compositions comprising the combination solid oral dosage form, described herein to thereby treat the disorder in a subject in need thereof.

In some embodiments of the methods and uses of the disclosure, the disorder is a hormone-dependent condition. Hormone-dependent conditions may include sex hormone-dependent cancer (e.g., uterine cancer, breast cancer, and ovarian cancer), bone metastasis of sex hormone-dependent cancer, hysteromyoma (uterine fibroids), adenomyoma, metrofibroma, precocious puberty, amenorrhea, premenstrual syndrome, dysmenorrhea, multilocular ovary syndrome, polycystic ovary syndrome, acne, infertility, hot flash, endometriosis, adenomyosis, heavy menstrual bleeding, and symptoms associated with these conditions. Such symptoms may include anemia, irregular periods, spotting, inflammation, pain, fatigue, urinary obstruction, urinary frequency, incontinence, constipation, anxiety, sleep disturbance, decrease in quality of life, difficulty with activities of daily living, female sexual dysfunction, and depression. In some embodiments of the methods and uses of the disclosure, the hormone-dependent condition is uterine cancer, breast cancer, or ovarian cancer. Additional disorders that Compound 1 is useful for treating are described in U.S. Pat. Nos. 7,300,935, 8,058,280, 8,735,401, 9,346,822, WO2018060501, and WO2018060463, incorporated herein by reference in their entireties. Results from phase 3 clinical trials featuring compound 1 may be found at https://investors.myovant.com/news-releases/news-release-details/myovant-sciences-announces-88-one-year-response-rate-positive/and at https://investors.myovant.com/news-releases/news-release-details/myovant-sciences-announces-positive-results-phase-3-spirit-2/.

In some embodiments of the methods and uses of the disclosure, the hormone-dependent condition is uterine cancer. In some embodiments of the methods and uses of the disclosure, the hormone-dependent condition is breast cancer. In some embodiments of the methods and uses of the disclosure, the hormone-dependent condition is ovarian cancer. In some embodiments of the methods and uses of the disclosure, the hormone-dependent condition is uterine fibroids. In some embodiments of the methods and uses of the disclosure, the hormone-dependent condition is heavy menstrual bleeding associated with uterine fibroids. In some embodiments of the methods and uses of the disclosure, the hormone-dependent condition is pain or other symptoms associated with uterine fibroids. In some embodiments of the methods and uses of the disclosure, the hormone-dependent condition is endometriosis. In some embodiments of the methods and uses of the disclosure, the hormone-dependent condition is pain associated with endometriosis. In some embodiments of the methods and uses of the disclosure, the hormone-dependent condition is adenomyosis. In some embodiments of the methods and uses of the disclosure, the hormone-dependent condition is heavy menstrual bleeding.

A "patient" or "subject" is a mammal. Examples of mammals may include, but are not limited to, any member of the class Mammalia including humans; non-human primates such as chimpanzees, monkeys, baboons, and rhesus monkeys; cattle, horses, sheep, goats, and swine; rabbits, dogs, and cats; and rodents such as rats, mice and guinea pigs. In some embodiments, the patient or subject is a human.

The terms "effective amount" or "therapeutically effective amount" when used in connection with one or more crystalline forms or pharmaceutical compositions of the disclosure may refer to a sufficient amount of the one or more crystalline forms or pharmaceutical compositions to provide the desired biological result. That result can be reduction and/or alleviation of the signs, symptoms, or causes of a disorder, or any other desired alteration of a biological system. For example, an "effective amount" for therapeutic use may be the amount of the pharmaceutical composition comprising one or more combination solid oral dosage forms as disclosed herein required to provide a clinically significant decrease in a disorder. An appropriate "effective amount" in any individual case may be determined by one of ordinary skill in the art using routine experimentation.

As used herein, the terms "treat" or "treatment" or cognates thereof, are meant to indicate a postponement of development of disorders; and/or reducing severity of such symptoms that will or are expected to develop. Thus, these terms may include ameliorating existing disorder symptoms; preventing additional symptoms; ameliorating or preventing the underlying causes of symptoms; inhibiting the disorder, e.g., arresting the development of the disorder; relieving the disorder; causing regression of the disorder; relieving a symptom caused by the disorder; or stopping or alleviating the symptoms of the disorder.

The terms "administered," "administration," or "administering" as used in this disclosure may refer to either directly administering one or more combination solid oral dosage forms or pharmaceutical compositions of the disclosure to a subject.

The present disclosure provides a method of treating a disorder comprising administering an effective amount of a combination solid oral dosage form to thereby treat the disorder in a subject in need thereof.

The present disclosure provides a method of treating a disorder comprising administering an effective amount of one or more pharmaceutical compositions of the present disclosure to thereby treat the disorder in a subject in need thereof. In some embodiments, the present disclosure provides a method of treating a disorder comprising administering an effective amount of one or more pharmaceutical compositions comprising one or more combination solid oral dosage forms disclosed herein to thereby treat the disorder in a subject in need thereof. In some embodiments, the disorder is a hormone-dependent condition.

The present disclosure provides one or more combination solid oral dosage forms of the present disclosure or one or more pharmaceutical compositions of the present disclosure for use in treating a disorder in a subject in need thereof. In some embodiments, the one or more pharmaceutical compositions of the present disclosure comprise one or more combination solid oral dosage forms disclosed herein. In some embodiments, the disorder is a hormone-dependent condition.

The present disclosure provides for use of one or more combination solid oral dosage forms of the present disclosure for treating a disorder in a subject in need thereof. In some embodiments, the present disclosure provides for use of a combination solid oral dosage form for treating a disorder in a subject in need thereof. In some embodiments, the disorder is a hormone-dependent condition.

The present disclosure provides for use of one or more pharmaceutical compositions of the present disclosure for treating a disorder in a subject in need thereof. In some embodiments, the present disclosure provides for use of one or more pharmaceutical compositions comprising one or more combination solid oral dosage forms disclosed herein for treating a disorder in a subject in need thereof. In some embodiments, the disorder is a hormone-dependent condition.

The present disclosure provides for use of one or more combination solid oral dosage forms of the present disclosure in the manufacture of a medicament for treating a disorder. In some embodiments, the present disclosure provides for use of a combination solid oral dosage form in the manufacture of a medicament for treating a disorder. In some embodiments, the disorder is a hormone-dependent condition.

The present disclosure provides for use of one or more pharmaceutical compositions of the present disclosure in the manufacture of a medicament for treating a disorder. In some embodiments, the present disclosure provides for use of one or more pharmaceutical compositions comprising one or more combination solid oral dosage forms disclosed herein in the manufacture of a medicament for treating a disorder. In some embodiments, the disorder is a hormone-dependent condition. In some embodiments, the present disclosure provides for use of a pharmaceutical composition comprising one or more combination solid oral dosage form disclosed herein in the manufacture of a medicament for treating a disorder. In some embodiments, the disorder is a hormone-dependent condition.

The present disclosure provides for use of one or more combination solid oral dosage forms of the present disclosure as a medicament for treating a disorder. In some embodiments, the present disclosure provides for use of a combination solid oral dosage form as a medicament for treating a disorder. In some embodiments, the disorder is a hormone-dependent condition.

The present disclosure provides for use of one or more pharmaceutical compositions of the present disclosure as a medicament for treating a disorder. In some embodiments, the present disclosure provides for use of one or more pharmaceutical compositions comprising one or more combination solid oral dosage forms disclosed herein as a medicament for treating a disorder. In some embodiments, the present disclosure provides for use of one or more pharmaceutical compositions comprising a combination solid oral dosage form as a medicament for treating a disorder. In some embodiments, the disorder is a hormone-dependent condition.

In some embodiments of the methods and uses of the disclosure, only one pharmaceutical composition of the disclosure is used in the methods or uses. In some embodiments of the methods and uses of the disclosure, only one combination solid oral dosage form of the disclosure is used in the methods or uses.

For the therapeutic uses mentioned herein, the dosage administered will, of course, vary with the one or more combination solid oral dosage forms or pharmaceutical compositions employed, the mode of administration, the treatment desired and the disorder indicated. For example, if the one or more combination solid oral dosage forms or pharmaceutical compositions is administered orally, then the daily dosage of the one or more combination solid oral dosage forms of the present disclosure may be in the range from about 1.0 miligram per kilogram body weight (mg/kg) to about 10 milligrams per kilogram body weight (mg/kg).

In some embodiments of combination solid oral dosage form, the Compound 1, or a corresponding amount of a pharmaceutically acceptable salt thereof and the hormone replacement medicaments are administered orally, once daily (although twice daily is possible) and formulated with a pharmaceutically acceptable excipients, such as excipients set forth above. The method of administration is for a treatment period of at least 14 days, at least 28 days, or at least 48 weeks to derive chronic therapy. Further, it is envisioned that the combination solid oral dosage form can include a sustained release profile component.

Embodiments of the present disclosure are described herein, in which some, but not all, embodiments of the disclosure are discussed. Indeed, the disclosure can be embodied in many different forms and should not be construed as limited to the embodiments set forth herein. Rather, these embodiments are provided so that this disclosure clearly satisfies applicable legal requirements. Like numbers refer to like elements throughout.

ENUMERATED EMBODIMENTS

Embodiment I-1. A combination solid oral dosage form comprising:
about 18% to 22% w/w of N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof;
about 0.3% to 0.7% w/w of estradiol;
about 0.1% to 0.4% w/w of norethindrone acetate;
about 24% to 28% w/w of mannitol;
about 2% to 6% w/w of a starch selected from the group consisting of sodium starch glycolate, pregelatinized starch, and a combination of the foregoing;
about 0.5% to 3% w/w of hydroxypropyl cellulose;
about 0.5% to 3% w/w of magnesium stearate;
about 38% to 42% w/w of lactose monohydrate; and
about 1% and 5% w/w of a film coating.

Embodiment I-2. The combination solid oral dosage form of embodiment I-1 comprising:
about 40 mg of N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof;
about 1 mg of estradiol;
about 0.5 mg of norethindrone acetate;
about 51 mg of mannitol;
about 9 mg of sodium starch glycolate;
about 3 mg of hydroxypropyl cellulose;
about 2 mg of magnesium stearate;
about 78 mg of lactose monohydrate; and
about 7 mg of a film coating.

Embodiment I-3. The combination solid oral dosage form of any one of embodiments I-1 to I-2, wherein the starch is sodium starch glycolate.

Embodiment I-4. The combination solid oral dosage form of embodiment I-3, wherein the combination solid oral dosage form comprises about 9 mg of sodium starch glycolate.

Embodiment I-5. The combination solid oral dosage form of any one of embodiments I-1 to I-2, wherein the starch is pregelatinized starch.

Embodiment I-6. The combination solid oral dosage form of any one of embodiments I-1 to I-2, wherein the starch is a combination of sodium starch glycolate and pregelatinized starch.

Embodiment I-7. The combination of solid oral dosage form of embodiment I-6 comprising about 2% to 3% sodium starch glycolate and about 2% to 3% pregelatinized starch.

Embodiment I-8. The combination solid oral dosage form of any one of embodiments I-1 to I-7, wherein the amount of relugolix degradant present after storing said combination solid oral dosage form for 6 months, at 60° C. and ambient relative humidity, does not exceed 0.5% w/w.

Embodiment I-9. The combination solid oral dosage form of any one of embodiments I-1 to I-8, wherein the amount of estradiol degradant present after storing said combination solid oral dosage form for 6 months, at 60° C. and ambient relative humidity, does not exceed 1.4% w/w.

Embodiment I-10. The combination solid oral dosage form of any one of embodiments I-1 to I-9, wherein the amount of norethindrone acetate degradant present after storing said combination solid oral dosage form for 6 months, at 60° C. and ambient relative humidity, does not exceed 1.4% w/w.

Embodiment I-11. A process for preparing the combination solid oral dosage form of any one of embodiments I-1 to I-10, said method comprising:
  a) preparing a first granulation comprising one or more sub-batches, wherein each sub-batch comprises the N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, the mannitol, a first fraction of the starch, and the hydroxypropyl cellulose;
  b) preparing a second granulation comprising the estradiol, the norethindrone acetate, a second fraction of the starch, and the lactose monohydrate;
  c) blending the first granulation and the second granulation, and the magnesium stearate to form a final blend; and
  d) coating the final blend with the film coating.

Embodiment I-12. The process of embodiment I-11 comprising:
  a) spraying an aqueous solution of the hydroxypropyl cellulose onto a fluidized mixture of the N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, the mannitol, and the first fraction of the starch to form an initial blend wherein the initial blend is dried and milled to produce a sub-batch; and wherein one or more sub-batches is blended to produce the first granulation;
  b) spraying a methanol solution of the estradiol and norethindrone acetate onto a fluidized mixture of a first fraction of the lactose monohydrate to form an initial lactose blend, wherein the initial lactose blend is dried, milled, and blended with a second fraction of the lactose monohydrate, and a second fraction of the starch to produce the second granulation;
  c) blending said first granulation with said second granulation, and the magnesium stearate, to produce the final blend, wherein the final blend is compressed; and
  d) coating the final blend with an aqueous film-coating suspension, and drying the resulting coated final blend to form the combination solid oral dosage form.

Embodiment I-13. The process of any of embodiment I-11 or I-12, wherein the second granulation does not comprise mannitol.

Embodiment I-14. The process of any of embodiments I-10 to I-13 wherein the first granulation comprises two sub-batches.

Embodiment I-15. The process of any of embodiments I-11 to I-14, wherein the N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, the mannitol, and the first fraction of the starch are fluidized in a fluid-bed granulator with an inlet air flow of 400-500 cfm, and at a temperature of 75-80° C.

Embodiment I-16. The process of any of embodiments I-12 to I-15, wherein the aqueous solution of the hydroxypropyl cellulose is sprayed at a rate of 250-350 g/min and a target atomization pressure of 2.5-4.5 bar.

Embodiment I-17. The process any of embodiments I-12 to I-16, wherein the initial blend is dried until a measured exhaust temperature reaches at least 37° C. and milled by a mill equipped with a 3 mm screen at an impeller speed of 930±100 rpm to produce the first granulation.

Embodiment I-18. The process of any of embodiments I-12 to I-17, wherein the first fraction of the lactose monohydrate is fluidized in a fluid-bed granulator with an inlet air flow of 750-1050 cfm, and at a temperature of 37-43° C.

Embodiment I-19. The process of any of embodiments I-12 to I-18, wherein the methanol solution of the estradiol and norethindrone acetate is sprayed at a rate of 550-650 g/min and a target atomization pressure of 5 bar.

Embodiment I-20. The process of any of embodiments I-12 to I-19, wherein the initial lactose blend is dried until a measured exhaust temperature reaches at least 46° C. and milled by a mill equipped with a 0.5 mm screen at an impeller speed of 2500±125 rpm.

Embodiment I-21. The process of embodiment I-20, wherein the initial lactose blend is further blended with the second fraction of the lactose monohydrate, and a second fraction of the starch for 180±15 revolutions.

Embodiment I-22. The process any of embodiments I-11 to I-21, wherein the first granulation and the second granulation are blended in a ratio of about 55% w/w and about 45% w/w respectively, for 70-170 revolutions.

Embodiment I-22a. The process of embodiment 22, wherein the blend of the first and second granulations is blended with magnesium stearate to produce the final blend.

Embodiment I-23. A combination solid oral dosage form produced by the process of any one of embodiments I-11 to I-22a.

Embodiment I-24. A method of treating a disorder in a subject in need thereof, comprising administering to the subject the combination solid oral dosage form of any one of embodiment I-1 to I-10, or I-23.

Embodiment I-25. The method of embodiment I-24, wherein the disorder is a hormone-dependent condition.

Embodiment I-26. The method of embodiment I-25, wherein the hormone-dependent condition is sex hormone-dependent cancer, uterine cancer, breast cancer, ovarian cancer, bone metastasis of sex hormone-dependent cancer, hysteromyoma, adenomyoma, metrofibroma, precocious puberty, amenorrhea, premenstrual syndrome, dysmenorrhea, multilocular ovary syndrome, polycystic ovary syndrome, infertility, hot flash, endometriosis, adenomyosis, or heavy menstrual bleeding.

Embodiment I-27. The method of any one of embodiments I-25 to I-26, wherein the hormone-dependent condition is uterine cancer, breast cancer, or ovarian cancer.

Embodiment I-28. The method of any one of embodiments I-25 to I-27, wherein the hormone-dependent condition is uterine cancer.

Embodiment I-29. The method of any one of embodiments I-25 to I-27, wherein the hormone-dependent condition is breast cancer.

Embodiment I-30. The method of any one of embodiments I-25 to I-27, wherein the hormone-dependent condition is ovarian cancer.

Embodiment I-31. The method of any one of embodiments I-25 to I-26, wherein the hormone-dependent condition is uterine fibroids.

Embodiment I-32. The method of embodiment I-25, wherein the hormone-dependent condition is heavy menstrual bleeding associated with uterine fibroids.

Embodiment I-33. The method of embodiment I-25, wherein the hormone-dependent condition is pain or other symptoms associated with uterine fibroids.

Embodiment I-34. The method of any one of embodiments I-25 to I-26, wherein the hormone-dependent condition is endometriosis.

Embodiment I-35. The method of any one of embodiments I-25 to I-26, wherein the hormone-dependent condition is adenomyosis.

Embodiment I-36. The method of any one of embodiments I-25 to I-26, wherein the hormone-dependent condition is heavy menstrual bleeding.

Embodiment I-37. A combination solid oral dosage form of any one of embodiment I-1 to I-10, or I-23 for use in treating a disorder in a subject in need thereof.

Embodiment I-38. The combination solid oral dosage form for use of embodiment I-37, wherein the disorder is a hormone-dependent condition.

Embodiment I-39. The combination solid oral dosage form for use of embodiment I-38, wherein the hormone-dependent condition is sex hormone-dependent cancer, uterine cancer, breast cancer, ovarian cancer, bone metastasis of sex hormone-dependent cancer, hysteromyoma, adenomyoma, metrofibroma, precocious puberty, amenorrhea, premenstrual syndrome, dysmenorrhea, multilocular ovary syndrome, polycystic ovary syndrome, acne, infertility, hot flash, endometriosis, adenomyosis, or heavy menstrual bleeding.

Embodiment I-40. The combination solid oral dosage form for use of any one of embodiments I-38 to I-39, wherein the hormone-dependent condition is uterine cancer, breast cancer, or ovarian cancer.

Embodiment I-41. The combination solid oral dosage form for use of any one of embodiments I-37 to I-39, wherein the hormone-dependent condition is uterine cancer.

Embodiment I-42. The combination solid oral dosage form for use of any one of embodiments I-38 to I-40, wherein the hormone-dependent condition is breast cancer.

Embodiment I-43. The combination solid oral dosage form for use of any one of any one of embodiments I-38 to I-40, wherein the hormone-dependent condition is ovarian cancer.

Embodiment I-44. The combination solid oral dosage form for use of any one of embodiments I-38 to I-39, wherein the hormone-dependent condition is uterine fibroids.

Embodiment I-45. The combination solid oral dosage form for use of embodiment I-38, wherein the hormone-dependent condition is heavy menstrual bleeding associated with uterine fibroids.

Embodiment I-46. The combination solid oral dosage form for use of embodiment I-38, wherein the hormone-dependent condition is pain or other symptoms associated with uterine fibroids.

Embodiment I-47. The combination solid oral dosage form for use of any one of embodiments I-38 to I-39, wherein the hormone-dependent condition is endometriosis.

Embodiment I-48. The combination solid oral dosage form for use of any one of embodiments I-38 to I-39, wherein the hormone-dependent condition is adenomyosis.

Embodiment I-49. The combination solid oral dosage form for use of any one of embodiments I-38 to I-39, wherein the hormone-dependent condition is heavy menstrual bleeding.

Embodiment I-50. Use of a combination solid oral dosage form of any one of embodiment I-1 to I-10, or I-23 in the manufacture of a medicament for treating a disorder.

Embodiment I-51. Use of a combination solid oral dosage form of any one of embodiment I-1 to I-10, or I-23 as a medicament for treating a disorder.

Embodiment I-52. The use of any one of embodiments I-50 to I-51, wherein the disorder is a hormone-dependent condition.

Embodiment I-53. The use of embodiment I-53, wherein the hormone-dependent condition is sex hormone-dependent cancer, uterine cancer, breast cancer, ovarian cancer, bone metastasis of sex hormone-dependent cancer, hysteromyoma, adenomyoma, metrofibroma, precocious puberty, amenorrhea, premenstrual syndrome, dysmenorrhea, multilocular ovary syndrome, polycystic ovary syndrome, acne, infertility, hot flash, endometriosis, adenomyosis, or heavy menstrual bleeding.

Embodiment I-54. The use of any one of embodiments I-52 to I-53, wherein the hormone-dependent condition is uterine cancer, breast cancer, or ovarian cancer.

Embodiment I-55. The use of any one of embodiments I-52 to I-54, wherein the hormone-dependent condition is uterine cancer.

Embodiment I-56. The use of any one of embodiments I-52 to I-54, wherein the hormone-dependent condition is breast cancer.

Embodiment I-57. The use of any one of embodiments I-52 to I-54, wherein the hormone-dependent condition is ovarian cancer.

Embodiment I-58. The use of any one of embodiments I-52 to I-53, wherein the hormone-dependent condition is uterine fibroids.

Embodiment I-59. The use of embodiment I-52, wherein the hormone-dependent condition is heavy menstrual bleeding associated with uterine fibroids.

Embodiment I-60. The use of embodiment I-52, wherein the hormone-dependent condition is pain or other symptoms associated with uterine fibroids.

Embodiment I-61. The use of any one of embodiments I-52 to I-53, wherein the hormone-dependent condition is endometriosis.

Embodiment I-62. The use of any one of embodiments I-52 to I-53, wherein the hormone-dependent condition is adenomyosis.

Embodiment I-63. The use of any one of embodiments I-52 to I-53, wherein the hormone-dependent condition is heavy menstrual bleeding.

The following non-limiting examples are provided to illustrate aspects of the present disclosure.

EXAMPLES

Example 1

Tablets of Compound 1, estradiol and norethindrone acetate were made using a wet granulation process that includes fluid-bed granulation, milling, blending and lubrication followed by tablet compression and film-coating. The final blend used to compress the tablets was composed of two fluid-bed granulations (FBG), one containing compound 1 (a first granulation) and the other containing E2 and NETA (a second granulation), and excipients.

The first granulation (compound 1 granulation blend; relugolix granulation blend) was prepared according to Steps R1-R4 in Table 1. Deaerated hydroxypropyl cellulose (HPC) binder solution was prepared according to Step R1. Compound 1, mannitol, and sodium starch glycolate were then fluidized in a fluid-bed granulator and sprayed with the HPC solution, and the resulting compound 1 granules were then dried. The granules were then milled using a rotating impeller screening mill with a 3 mm screen (Step R3) to produce a sub-batch. A second sub-batch of compound 1 granules was prepared in the same manner, and the two sub-batches were then blended in a diffusion blender (Step R4).

TABLE 1

Description of Compound 1 (relugolix) Granulation, Milling and Blending Processes to produce a First Granulation

| Step | Description |
|---|---|
| R1 | Dissolve hydroxypropyl cellulose (HPC) in purified water. Allow the HPC solution to deaerate prior to proceeding to Step R2. |
| R2 | Charge relugolix (compound 1), mannitol and sodium starch glycolate into a fluid-bed granulator. Fluidize the powder bed at a target inlet air flow of 400-500 cfm and target temperature of 75-80° C. Spray the entire HPC binder solution from Step R1 at a target rate of 250-350 g/min and target atomization pressure of 2.5-4.5 bar. Dry the compound 1 granules until the exhaust temperature reaches ≥37° C. |
| R3 | Pass the dried compound 1 granules from Step R2 through a mill equipped with a 3 mm screen at a target impeller speed of 930 ± 100 rpm. |
| R4 | Repeat Steps R1, R2 and R3 to generate the second sub batch. Blend the two compound 1 granulation sub batches for a target of 120 ± 10 revolutions. |

The second granulation blend (estradiol/norethindrone acetate granulation blend) was prepared according to Steps E1-E4 in Table 2. First, estradiol and norethindrone acetate were dissolved in methanol (Step E1). Lactose monohydrate was charged into a fluid-bed granulator. The powder bed was fluidized in a fluid-bed granulator, and the estradiol/norethindrone acetate solution from Step E1 was sprayed onto the powder, and the resulting E2/NETA granules were dried until the loss on drying (LOD) was <2% w/w. The granules were then milled using a screening mill with a 0.5 mm screen (Step E3) before blending with lactose monohydrate and sodium starch glycolate in a diffusion blender (Step E4).

TABLE 2

Description of Estradiol/Norethindrone Acetate Granulation, Milling and Blending Processes to Produce a Second Granulation

| Step | Description |
|---|---|
| E1 | Dissolve estradiol and norethindrone acetate (E2/NETA) in methanol. |
| E2 | Charge lactose monohydrate into a fluid-bed granulator. Fluidize the powder bed at a target inlet air flow of 750-1050 cfm and target inlet temperature of 37-43° C. Spray the entire E2/NETA solution from Step E1 at a target spray rate of 550-650 g/min and target atomization pressure of 5 bar. Dry the E2/NETA granules until the exhaust temperature reaches ≥46° C. Measure the loss on drying (LOD) of the granules. If the LOD is ≤2.0% w/w proceed to Step E3. If the LOD is >2% w/w, continue drying until the LOD is ≤2% w/w. |
| E3 | Pass the dried granules from Step E2 through a mill equipped with a 0.5 mm screen at a target impeller speed of 2500 ± 125 rpm. |
| E4 | Blend the milled granules from Step E3 with lactose monohydrate and sodium starch glycolate for a target of 180 ± 15 revolutions. |

The final combination solid oral dosage form was prepared and packaged according to Steps C1-C5 of Table 3. The first granulation (Step R4) and the second granulation blend (Step E4) were combined in a diffusion blender (Step C1). Magnesium stearate was then added at 1% w/w to the mixture and blended to lubricate (Step C2), producing a final blend. This final blend was then compressed in a tablet press (Step C3). The tablets were pre-heated in a perforated pan-coater, and a prepared suspension of Opadry II Yellow in purified water was sprayed onto the tablets until a tablet weight gain of 4% (±1%) w/w was achieved, at which point the tablets were dried (Step C4), producing the final combination solid oral dosage form. The coated tablets were then packaged using a filler and sealed using induction sealing.

TABLE 3

Description of compound 1/E2/NETA Blending, Lubrication Compression, Film-Coating and Packaging Processes to Produce a Combination Solid Oral Dosage Form

| Step | Description |
|---|---|
| C1 | Combine the first granulation (Step R4 in Table 1) and the second granulation (Step E4 in Table 2) in a blender at a ratio of about 53.5% w/w to 45.5% w/w, respectively. Blend for a target of 70-170 revolutions. |
| C2 | Charge magnesium stearate at 1% w/w into the blender from Step C1. Lubricate for a target of 36 ± 3 revolutions with the compound 1/E2/NETA blend. |
| C3 | Compress the final blend from Step C2 into core tablets with a target weight of 185 mg and a target hardness of 10 kp using a rotary tablet press equipped with 8 mm round tooling embossed with "MVT" on one side and "415" on the other. |
| C4 | Prepare film-coating suspension by dispersing Opadry II Yellow in purified water. Charge the core tablets into a perforated pan-coater and allow them to pre-heat. Once the pre-heating is complete, initiate spraying of the Opadry suspension at a target spray rate of 280-320 g/min and a target exhaust temperature of 45-51° C. The inlet air temperature is adjusted to maintain the target exhaust temperature and the pan speed target is 4-5 rpm. Continue spraying the film-coating solution until a target tablet weight gain of 4% (±1%) w/w is achieved. Once the target weight gain is achieved, dry the tablets. |
| C5 | Package the film-coated tablets from Step C4 in the approved container closure system. Packaging and labeling operations are performed on automatic, semi-automatic, or hand operated equipment according to written procedures that are standard for this product type to assure product integrity, purity, and strength. |

Table 4 shows a formulation of the compound 1/E2/NETA combination solid oral dosage form tablets, each component listed in mg/tablet, prepared according to the steps of Example 1. The final tablet is comprised of approximately 100 mg of the compound 1 (first) granulation (Steps R1-R4), approximately 85 mg of the E2/NETA (second) granulation (Steps E1-E4), and approximately 7.4 mg of film-coating (Step C4).

TABLE 4

Formulation Composition of the compound 1/E2/NETA combination solid oral dosage form Tablets

| Component | Quality Standard | Function | Composition (% w/w)* | (mg/Tablet) |
|---|---|---|---|---|
| Core Tablet | | | | |
| Relugolix | In-house | Active ingredient | 21.6 | 40.0 |
| Estradiol | In-house | Active ingredient | 0.5 | 1.0 |
| Norethindrone acetate | In-house | Active ingredient | 0.3 | 0.5 |
| Mannitol | USP-NF/Ph. Eur. | Diluent | 27.6 | 51.0 |
| Sodium starch glycolate | USP-NF/Ph. Eur. | Disintegrant | 5.0 | 9.3 |
| Hydroxypropyl cellulose | USP-NF/Ph. Eur. | Binder | 1.6 | 3.0 |
| Lactose monohydrate | USP-NF/Ph. Eur. | Diluent | 42.4 | 78.4 |
| Magnesium stearate | USP-NF/Ph. Eur. | Lubricant | 1.0 | 1.9 |
| Purified water | USP-NF/Ph. Eur. | Processing aid | qs | qs |
| Methanol | USP-NF/Ph. Eur. | Processing aid | qs | qs |
| | | Total Core | 100 | 185 |
| Film Coated Tablet | | | | |
| Opadry II Yellow | In-house | Film-coating System | 4.0 | 7.4 |
| Purified water | USP-NF/Ph. Eur. | Processing aid | qs | qs |
| | | Total Film-Coated Tablet | 104 | 192 |

*% w/w in this table refers to the weight fraction of the "Total Core," the formulation prior to film-coating. The total % w/w of the film-coated tablet is therefore above 100%.

Alternative formulations containing varied amounts of excipients, including but not limited to, lactose and microcrystalline cellulose (MCC, pH101 or pH102) in the E2/NETA (second) granulation mix may be prepared by the methods of Example 1 or methods similar to those of Example 1. These formulations (Examples 2-10) contain the listed components, with amounts noted in mg/final tablet.

Alternative formulations containing varied amounts of excipients, including but not limited to, mannitol and microcrystalline cellulose (MCC, pH101 or pH102) in the E2/NETA (second) granulation mix may be prepared by the methods of Example 1 or methods similar to those of Example 1. These formulations (Examples 11-19) contain the listed components, with amounts noted in mg/final tablet.

Alternative formulations shown in Examples 2-19 might contain additional excipients than those included in the methods of Example 1.

Example 2

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), and hydroxypropyl cellulose (3 mg/tablet).

The E2/NETA Granulation is comprised of E2 (1 mg/tablet), NETA (0.5 mg/tablet), lactose (78.4 mg/tablet), and pregelatinized starch (4.25 mg/tablet).

Magnesium stearate (1.85 mg/tablet) is added in the final blend.

Example 3

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), lactose (78.4 mg/tablet), pregelatinized starch (4.25 mg/tablet), and magnesium stearate (0.85 mg/tablet).

Example 4

An alternative tablet formulation may be prepared by methods similar to Example 1. The compound 1 (Relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), lactose (78.4 mg/tablet), pregelatinized starch (4.25 mg/tablet), and magnesium stearate (0.85 mg/tablet).

Example 5

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), lactose (78.4 mg/tablet), pregelatinized starch (4.25 mg/tablet), and magnesium stearate (0.85 mg/tablet).

Example 6

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), lactose (78.4 mg/tablet), pregelatinized starch (4.25 mg/tablet), and magnesium stearate (0.85 mg/tablet).

Example 7

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), lactose (52.9 mg/tablet), MCC pH102 (25.5 mg/tablet), pregelatinized starch (4.25 mg/tablet), and magnesium stearate (0.85 mg/tablet).

Example 8

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), lactose (69.9 mg/tablet), MCC pH102 (8.5 mg/tablet), pregelatinized starch (4.25 mg/tablet), and magnesium stearate (0.85 mg/tablet).

Example 9

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), lactose (69.9 mg/tablet), MCC pH101 (8.5 mg/tablet), pregelatinized starch (4.25 mg/tablet), and magnesium stearate (0.85 mg/tablet).

Example 10

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), lactose (69.9 mg/tablet), MCC pH101 (8.5 mg/tablet), sodium starch glycolate (4.25 mg/tablet), and magnesium stearate (0.85 mg/tablet).

Example 11

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), and hydroxypropyl cellulose (3 mg/tablet).

The E2/NETA Granulation is comprised of E2 (1 mg/tablet), NETA (0.5 mg/tablet), mannitol 100 SD (78.4 mg/tablet), and sodium starch glycolate (4.25 mg/tablet).

Magnesium stearate (1.85 mg/tablet) is added in the final blend.

Example 12

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), mannitol 100 SD (78.4 mg/tablet), sodium starch glycolate (4.25 mg/tablet), and magnesium stearate (0.85 mg/tablet).

Example 13

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), mannitol 100 SD (78.4 mg/tablet), sodium starch glycolate (4.25 mg/tablet), and magnesium stearate (0.85 mg/tablet).

Example 14

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), mannitol 100 SD (78.4 mg/tablet), sodium starch glycolate (4.25 mg/tablet), and magnesium stearate (0.85 mg/tablet).

Example 15

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), mannitol 100 SD (52.9 mg/tablet), MCC pH102 (24.57 mg/tablet), sodium starch glycolate (4.25 mg/tablet), and magnesium stearate (1.78 mg/tablet).

Example 16

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), mannitol 100 SD (68.88 mg/tablet), MCC pH102 (8.5 mg/tablet), sodium starch glycolate (4.25 mg/tablet), and magnesium stearate (1.78 mg/tablet).

Example 17

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), mannitol 100 SD (68.88 mg/tablet), MCC pH101 (8.5 mg/tablet), sodium starch glycolate (4.25 mg/tablet), and magnesium stearate (1.78 mg/tablet).

Example 18

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), mannitol 100 SD (68.03 mg/tablet), MCC pH101 (8.5 mg/tablet), sodium starch glycolate (4.25 mg/tablet), and magnesium stearate (2.70 mg/tablet).

Example 19

An alternative tablet formulation may be prepared by methods similar to Example 1. The compound 1 (relugolix) Granulation is comprised of compound 1 (40 mg/tablet), mannitol (51 mg/tablet), sodium starch glycolate (5 mg/tablet), hydroxypropyl cellulose (3 mg/tablet), and magnesium stearate (1 mg/tablet).

The E2/NETA Granulation is comprised of E2 (1 mg/tablet), NETA (0.5 mg/tablet), lactose (8.5 mg/tablet), mannitol 100 SD (68.03 mg/tablet), sodium starch glycolate (4.25 mg/tablet), and magnesium stearate (0.85 mg/tablet).

Example 20

Formulations of this disclosure can comprise varying amounts of mannitol and/or lactose. Table 5 shows two such formulations. Formulation Lactose VX contains a small quantity of total mannitol (27.57% w/w) with a larger mass of lactose (42.37% w/w). Formulation Mannitol VW contains only mannitol (69.94% w/w), and no lactose.

TABLE 5

Composition of sample formulations
Lactose VX and Mannitol VW

| Components | Lactose VX | | Mannitol VW | |
|---|---|---|---|---|
| | % w/w | mg/tb | % w/w | mg/tb |
| Compound 1 (relugolix) | 21.62% | 40 | 21.62% | 40 |
| Mannitol | 27.57% | 51 | 69.94% | 129.4 |
| Sodium Starch Glycolate | 2.70% | 5 | 5.00% | 9.25 |

TABLE 5-continued

Composition of sample formulations
Lactose VX and Mannitol VW

| Components | Lactose VX | | Mannitol VW | |
|---|---|---|---|---|
| | % w/w | mg/tb | % w/w | mg/tb |
| Hydroxypropyl Cellulose | 1.62% | 3 | 1.62% | 3 |
| Estradiol Hemihydrate | 0.54% | 1 | 0.54% | 1 |
| Norethindrone Acetate | 0.27% | 0.5 | 0.27% | 0.5 |
| Lactose | 42.37% | 78.4 | — | — |
| Pregelatinized Starch | 2.30% | 4.25 | — | — |
| Magnesium Stearate FB | 1.00% | 1.85 | 1.00% | 1.85 |

Formulations comprising lactose were more stable than those containing both lactose and mannitol, or those containing mannitol alone, when the formulations were stored over a period of 2 weeks to 6 months. Table 6 shows one stability study, wherein Lactose VX and Mannitol VW formulations were stored, sealed, at 60° C. and ambient relative humidity. The degradation of compound 1, E2, and NETA was analyzed at various timepoints, recorded in Table 6 as the impurity % (w/w) versus a standard working solution of each component. For instance, a value of 0.37 under the compound 1 heading means the total amount of degradant (impurity) is 0.37% w/w of the initial mass of compound 1 compared to a standard working solution of compound 1.

To prepare sample solutions of the formulations for analysis of compound 1, 12 tablets were weighed and transferred into a 50 mL volumetric flask, and 7 mL of D.I. water was added. The tablets were shaken on a mechanical shaker until all of the tablets disintegrated completely. 13 mL of ethanol and 20 mL of diluent (65:35 ethanol:water) were added, and the solution was sonicated for 20 minutes before being equilibrated and diluted with diluent. The solution was mixed and filtered through a 0.2 μm PVDF syringe filter, discarding the first 3 mL of the filtrate. The filtrate was collected and analyzed by ultra performance liquid chromatography (UPLC).

The prepared sample was run on UPLC, eluting with 100% pH 2.4 phosphate buffer:acetonitrile:tetrahydrofuran (21:2:2). Compound 1 was detected at 290 nm, with a retention time of approximately 26.1 minutes.

To prepare sample solutions of the formulations for analysis of E2 and NETA, 10 tablets were weighed and transferred into a 250 mL volumetric flask, and diluent (0.05M phosphate solution:acetonitrile, 4:1) was added to about 80% volume. The tablets were shaken on a mechanical shaker and sonicated until all of the tablets disintegrated completely. The solution was filtered through a 0.45 μm PVDF syringe filter, discarding the first 3 mL of the filtrate. The filtrate was collected and further diluted, by pipetting 6.0 mL of the filtrate into a 20 mL volumetric flask, and diluting to volume with diluent. The mixed sample was then analyzed by ultra performance liquid chromatography (UPLC). The prepared sample was run on UPLC, eluting with running solutions A (0.2% trifluoroacetic acid in water) and B (0.2% trifluoroacetic acid in acetonitrile). The gradient was ramped from 80% A and 20% B at time=0 minutes to 10% A and 90% B at time=30 minutes. NETA was detected at 240 nm with an approximate retention time of 23.2 minutes, and E2 was detected at 280 nm with an approximate retention time of 18.5 minutes.

TABLE 6

Comparative Degradation of Active Ingredients in Lactose and Mannitol Formulations at 60° C. and ambient relative humidity

|  | Total Impurities (% w/w) - Lactose VX | | | Total Impurities (% w/w) - Mannitol VW | | |
|---|---|---|---|---|---|---|
| Timepoint | relugolix | E2 | NETA | relugolix | E2 | NETA |
| Initial | 0.13 | 0.20 | 0.27 | 0.13 | 0.20 | 0.34 |
| 2 weeks | 0.23 | 0.22 | 0.44 | 0.31 | 0.24 | 1.25 |
| 1 month | 0.33 | 0.25 | 0.44 | 0.41 | 0.24 | 1.28 |
| 3 months | 0.34 | 0.24 | 0.41 | 0.53 | 0.35 | 1.63 |
| 6 months | 0.37 | 1.24 | 0.63 | 0.61 | 1.59 | 3.30 |

As shown in Table 6, the amount of NETA degradant in Mannitol VW increases to 1.25% after only 2 weeks of storage at 60° C., and reaches 3.3% after 6 months. In Lactose VX, the amount of NETA degradant is only 0.63% after 6 months. Similarly, the relative amount of E2 degradants for E2 for Lactose VX and Mannitol VW are 1.24% and 1.59% respectively. The thermal stability of lactose formulations is therefore preferable to that of mannitol formulations.

Example 21

A bioequivalence study was conducted between a combination solid oral dosage form (of Table 4) and co-administration of compound 1 and Activella (E2/NETA).

Activella is a tablet for oral administration containing either 1 mg of estradiol and 0.5 mg of norethindrone acetate plus excipients, of 0.5 mg of estradiol and 0.1 mg of norethindrone acetate.

The combination solid oral dosage form bioequivalence study was an open-label, randomized, two-treatment, three-sequence, three-period crossover and partial replicate, single-dose study to demonstrate the bioequivalence between the a combination solid oral dosage form tablet and co-administration of a 40-mg relugolix tablet (T4B formulation) and Activella (1-mg E2/0.5-mg NETA) in healthy postmenopausal women. The study designs were in accordance with the FDA guidance document on bioequivalence studies (FDA 2019b) and also met recommendations in the EMA Guideline on the Investigation of Bioequivalence.

Study participants were randomized into one of three treatment sequences with a 10-day washout interval between treatment periods. Each treatment sequence consisted of a partial replicate design in which each participant received the combination solid oral dosage form tablet once and co-administration of relugolix and Activella twice in a crossover manner. On Day 1 of each treatment period, study participants received their assigned study treatment with 240 mL water after an overnight fast of at least 10 hours and continued to fast for approximately 4 hours postdose. Water was restricted 1 hour prior to and after study drug administration. Blood sampling was collected up to 168 hours postdose for determination of relugolix plasma concentrations and up to 72 hours postdose for determination of NET plasma concentrations and unconjugated E2, unconjugated E1 and total E1 serum concentrations. Triplicate blood samples (at −1.0, −0.5 and 0-hours relative to study drug administration) were collected at predose for determination of unconjugated E2 and total and unconjugated E1 serum concentrations to facilitate calculation of baseline-adjusted PK parameters. Ninety participants were planned based on pharmacokinetic variability estimates from a previously conducted combination solid oral dosage form biocomparability study and were randomized (n=30 in each treatment sequence), and of those 86 participants completed the study. The mean age of study participants was 55.9 years.

For the bioequivalence assessment between the combination solid oral dosage form tablet and co-administration of a 40-mg compound 1 (relugolix) tablet and Activella, the $AUC_{0-\infty}$ and $C_{max}$ of compound 1 (relugolix), baseline-adjusted unconjugated E2, baseline-adjusted total E1, and NET, were pre-specified as primary endpoints. The $AUC_{0-\infty}$ and $C_{max}$ of unadjusted unconjugated E2, unadjusted total E1, and unconjugated E1 (with and without baseline-adjustment) were provided as secondary endpoints for completeness. Log-transformed pharmacokinetic parameters were analyzed by either ABE method or RSABE method, depending on the within-reference treatment coefficient of variation ($CV_{WR}$ %) of that parameter. The ABE method was used to assess the bioequivalence of pharmacokinetic parameters with low within-reference treatment variability ($CV_{WR}$ %<30%), including the $AUC_{0-\infty}$ and $C_{max}$ of unconjugated E2, total and unconjugated E1, and NET, with the limit of (0.8000, 1.2500) for the 90% CI for the GMRs (combination solid oral dosage form tablet/co-administration of compound 1 (relugolix) and Activella) as the acceptance criteria. The $AUC_{0-\infty}$ and $C_{max}$ of E2 and E1 with and without baseline-adjustment were calculated. The RSABE method was used to assess the bioequivalence of pharmacokinetic parameters with high within-reference treatment variability ($CV_{WR}$ %≥30%), including the $AUC_{0-\infty}$ and $C_{max}$ of compound 1 (relugolix), with the limit of (0.8000, 1.2500) for the GMRs (combination solid oral dosage form tablet/co-administration of compound 1 (relugolix) and Activella) and the 95% upper confidence bound for reference-scaled difference less than or equal to zero as the acceptance criteria.

Results of the bioequivalence study are shown in FIG. 1 and Table 7. The "FDC" label corresponds to the combination solid oral dosage form.

Bioequivalence between the FDC tablet and co-administration of a 40-mg relugolix tablet and E2/NETA was established based on the pre-specified acceptance criteria per the FDA (e.g., Guidance for Industry, Statistical Approaches to Establishing Bioequivalence, U.S. Department of Health and Human Services, Food and Drug Administration, Center for Drug Evaluation and Research [CDER], January 2001) and the EMA (e.g., Guideline on the investigation of bioequivalence. 2010) requirements. All the 16 primary and secondary endpoints met the bioequivalence acceptance criteria for the respective statistical methods.

Single doses of the FDC tablet or co-administration of relugolix and E2/NETA were generally safe and well-tolerated. All the 18 reported adverse events (in 15 participants) were mild or moderate in severity and transient in nature, of which 12 events (in 9 participants) were considered to be study drug-related. There were no deaths or serious adverse events in this study. One participant was discontinued from the study due to a nonserious adverse event (tooth abscess).

The definitions of certain abbreviations used herein include: $AUC_{0-\infty}$=area under the concentration-time curve from time zero extrapolated to infinity; $C_{max}$=maximum observed concentration; CI=confidence interval; CV=coefficient of variation; E1=estrone; E2=estradiol; FDA=Food and Drug Administration; FDC=fixed-dose combination; GMR=geometric mean ratio; NET=norethindrone; RSABE=reference-scaled average bioequivalence.

TABLE 7

Results of the bioequivalence study

| Analyte | Pharmacokinetic Parameter | n | $CV_{WR}$ % | Geometric Mean or Geometric $LSM^a$ | FDC Tablet/Co-Admin. Relugolix + Activella | | 95% Upper Confidence Bound[b] |
|---|---|---|---|---|---|---|---|
| | | | | | GMR (SE) | 90% CI | |
| | Primary Endpoints | | | | | | |
| Relugolix | | | | $AUC_{0-\infty}$ (ng*hr/mL) | | | |
| (Compound 1) | FDC Tablet Co-administration (Relugolix + Activella) | 85 | 37.6 | 171.5 169.6 | 1.0111 (0.0486) | — | −0.0826 |
| | | | | $C_{max}$ (ng/mL) | | | |
| | FDC Tablet Co-administration (Relugolix + Activella) | 85 | 59.2 | 20.59 20.17 | 1.0209 (0.0726) | — | −0.1875 |
| Baseline- | | | | $AUC_{0-\infty}$ (pg*hr/mL) | | | |
| Adjusted Unconjugated E2 | FDC Tablet Co-administration (Relugolix + Activella) | 62 | 22.3 | 788.2 785.7 | 1.0031 (0.0307) | 0.9531, 1.0558 | — |
| | | | | $C_{max}$ (pg/mL) | | | |
| | FDC Tablet Co-administration (Relugolix + Activella) | 85 | 26.1 | 25.53 24.01 | 1.0634 (0.0320) | 1.0115, 1.1180 | — |
| Baseline- | | | | $AUC_{0-\infty}$ (pg*hr/mL) | | | |
| Adjusted Total E1 | FDC Tablet Co-administration (Relugolix + Activella) | 79 | 13.8 | 172.7 175.4 | 0.9845 (0.0155) | 0.9589, 1.0107 | — |
| | | | | $C_{max}$ (pg/mL) | | | |
| | FDC Tablet Co-administration (Relugolix + Activella) | 85 | 15.0 | 19.97 22.40 | 0.8919 (0.0212) | 0.8573, 0.9278 | — |
| NETA | | | | $AUC_{0-\infty}$ (ng*hr/mL) | | | |
| | Combination Tablet Co-administration (Relugolix + Activella) | 85 | 8.5 | 15.74 15.81 | 0.9957 (0.0123) | 0.9754, 1.0165 | — |
| | | | | $C_{max}$ (ng/mL) | | | |
| | combinationTablet Co-administration (Relugolix + Activella) | 85 | 16.1 | 3.307 3.896 | 0.8488 (0.0216) | 0.8137, 0.8854 | — |
| | Secondary Endpoints | | | | | | |
| Unadjusted | | | | $AUC_{0-\infty}$ (pg*hr/mL) | | | |
| Unconjugated E2 | combinationTablet Co-administration (Relugolix + Activella) | 65 | 16.0 | 1385 1435 | 0.9655 (0.0215) | 0.9303, 1.0021 | — |
| | | | | $C_{max}$ (pg/mL) | | | |
| | combinationTablet Co-administration (Relugolix + Activella) | 85 | 23.3 | 32.26 30.62 | 1.0535 (0.0274) | 1.0089, 1.1001 | — |
| Unadjusted Total E1 | | | | $AUC_{0-\infty}$ (ng*hr/mL) | | | |
| | combination Tablet Co-administration Relugolix + Activella | 78 | 13.6 | 195.9 200.7 | 0.9764 (0.0160) | 0.9501, 1.0033 | — |
| | | | | $C_{max}$ (ng/mL) | | | |
| | combination Tablet Co-administration Relugolix + Activella | 85 | 14.8 | 20.19 22.62 | 0.8925 (0.0211) | 0.8581, 0.9283 | — |
| Baseline- | | | | $AUC_{0-\infty}$ (pg*hr/mL) | | | |
| Adjusted Unconjugated E1 | combination Tablet Co-administration Relugolix + Activella | 71 | 15.0 | 3985 4022 | 0.9909 (0.0203) | 0.9576, 1.0253 | — |

TABLE 7-continued

Results of the bioequivalence study

| | | | | Geometric | FDC Tablet/Co-Admin. Relugolix + Activella | | |
|---|---|---|---|---|---|---|---|
| Analyte | Pharmacokinetic Parameter | n | $CV_{WR}$ % | Mean or Geometric $LSM^a$ | GMR (SE) | 90% CI | 95% Upper Confidence Bound[b] |
| | $C_{max}$ (pg/mL) | | | | | | |
| | combination Tablet Co-administration Relugolix + Activella | 85 | 14.8 | 180.7 181.6 | 0.9947 (0.0201) | 0.9619, 1.0287 | — |
| Unadjusted | $AUC_{0-\infty}$ (pg*hr/mL) | | | | | | |
| Unconjugated E1 | combination Tablet Co-administration Relugolix + Activella | 68 | 13.3 | 6726 6843 | 0.9830 (0.0171) | 0.9549, 1.0119 | — |
| | $C_{max}$ (pg/mL) | | | | | | |
| | combination Tablet Co-administration Relugolix + Activella | 85 | 13.1 | 203.0 203.7 | 0.9965 (0.0182) | 0.9668, 1.0272 | — |

Example 22

An attempt to make an alternative formulation by a method similar to that of Example 1, wherein ethanol was used instead of methanol in the second granulation blend, was unsuccessful. Referring to Table 2, ethanol was used in place of methanol in step E1. Also, only NETA was used instead of a combination of E2/NETA. After the powder bed was fluidized and the NETA/ethanol solution was sprayed onto the powder, the resulting granules adhered to the wall of the vessel. After granulation and discharge, the yield was 88.3%. The material also had a lumpy consistency. NETA content was measured by HPLC. The results showed high variability in the amount of NETA throughout the granulated material, with a standard deviation of 11.4%.

What is claimed is:

1. A combination solid oral dosage form comprising:
   about 18% to 22% w/w of N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof;
   about 0.3% to 0.7% w/w of estradiol;
   about 0.1% to 0.4% w/w of norethindrone acetate;
   about 24% to 28% w/w of mannitol;
   about 2% to 6% w/w of a starch selected from the group consisting of sodium starch glycolate, pregelatinized starch, and a combination of the foregoing;
   about 0.5% to 3% w/w of hydroxypropyl cellulose;
   about 0.5% to 3% w/w of magnesium stearate;
   about 38% to 42% w/w of lactose monohydrate; and
   about 1% to 5% w/w of a film coating.

2. The combination solid oral dosage form of claim 1 comprising:
   about 40 mg of N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof;
   about 1 mg of estradiol;
   about 0.5 mg of norethindrone acetate;
   about 51 mg of mannitol;
   about 9 mg of sodium starch glycolate;
   about 3 mg of hydroxypropyl cellulose;
   about 2 mg of magnesium stearate;
   about 78 mg of lactose monohydrate; and
   about 7 mg of a film coating.

3. The combination solid oral dosage form of claim 1, wherein the starch is sodium starch glycolate.

4. The combination solid oral dosage form of claim 3, wherein the combination solid oral dosage form comprises about 9 mg of sodium starch glycolate.

5. The combination solid oral dosage form of claim 1, wherein the starch is pregelatinized starch.

6. The combination solid oral dosage form of claim 1, wherein the starch is a combination of sodium starch glycolate and pregelatinized starch.

7. The combination solid oral dosage form of claim 6 comprising about 2% to 3% w/w sodium starch glycolate and about 2% to 3% w/w pregelatinized starch.

8. The combination solid oral dosage form of claim 1, wherein the amount of relugolix degradant present after storing said combination solid oral dosage form for 6 months, at 60° C. and ambient relative humidity, does not exceed 0.5% w/w.

9. The combination solid oral dosage form of claim 1, wherein the amount of estradiol degradant present after storing said combination solid oral dosage form for 6 months, at 60° C. and ambient relative humidity, does not exceed 1.4% w/w.

10. The combination solid oral dosage form of claim 1, wherein the amount of norethindrone acetate degradant present after storing said combination solid oral dosage form for 6 months, at 60° C. and ambient relative humidity, does not exceed 1.4% w/w.

11. The combination solid oral dosage form of claim 1, wherein when administered orally to a subject the mean maximum plasma concentration ($C_{max}$) of N-(4-(1-(2,6-difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, is in the range of 10 ng/ml to 30 ng/mL.

12. The combination solid oral dosage form of claim 2, wherein when administered orally to a subject the mean maximum plasma concentration ($C_{max}$) of N-(4-(1-(2,6- difluorobenzyl)-5-((dimethylamino)methyl)-3-(6-methoxy-3-pyridazinyl)-2,4-dioxo-1,2,3,4-tetrahydrothieno[2,3-d]pyrimidin-6-yl)phenyl)-N'-methoxyurea, or a corresponding amount of a pharmaceutically acceptable salt thereof, is in the range of 10 ng/ml to 30 ng/mL.

* * * * *